US012590031B2

(12) United States Patent
Shakouri

(10) Patent No.: US 12,590,031 B2
(45) Date of Patent: Mar. 31, 2026

(54) AGRICULTURAL WASTE ASH AS CEMENTITIOUS MATERIAL AND METHODS OF MAKING THE SAME

(71) Applicant: Colorado State University Research Foundation, Fort Collins, CO (US)

(72) Inventor: Mahmoud Shakouri, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 507 days.

(21) Appl. No.: 18/096,509

(22) Filed: Jan. 12, 2023

(65) Prior Publication Data

US 2023/0219849 A1    Jul. 13, 2023

Related U.S. Application Data

(60) Provisional application No. 63/299,298, filed on Jan. 13, 2022.

(51) Int. Cl.
| | |
|---|---|
| *C04B 28/02* | (2006.01) |
| *C04B 7/28* | (2006.01) |
| *C04B 18/24* | (2006.01) |

(52) U.S. Cl.
CPC .............. *C04B 28/021* (2013.01); *C04B 7/28* (2013.01); *C04B 18/24* (2013.01)

(58) Field of Classification Search
CPC ......... C04B 28/021; C04B 7/28; C04B 18/24; C04B 28/04; C04B 20/023; Y02W 30/91
See application file for complete search history.

(56) References Cited

U.S. PATENT DOCUMENTS

2002/0160174 A1* 10/2002 Nanko ................... C04B 20/10
                                                    156/276
2006/0022373 A1*  2/2006 Ward ..................... B28B 1/525
                                                    425/62
(Continued)

FOREIGN PATENT DOCUMENTS

CN       107298563 A  * 10/2017
GB         2334902 A  *  9/1999  ............. B28C 5/404
(Continued)

OTHER PUBLICATIONS

JPH05194007 Machine Translation (Year: 1993).*
(Continued)

*Primary Examiner* — Pamela H Weiss
(74) *Attorney, Agent, or Firm* — Patterson + Sheridan, LLP

(57)        ABSTRACT
Embodiments of the present disclosure relate to methods of a method of making agricultural waste ash supplementary cementitious materials (AWASCMs), the method includes pretreating agricultural waste with acid, burning the acid pretreated agricultural waste to form agricultural waste ash (AWA), heat treating the AWA, grinding the AWA into an AWA supplemental cementitious material (AWASCM), and mixing the AWASCM with cement, water, and supplementary cementitious materials (SCMs) to create a cement paste. Embodiments of the present disclosure relate to a composition including sand, coarse aggregate, and cementitious materials. The cementitious materials includes cement, a SCM, and an AWASCM. The AWASCM includes an AWA and AWF.

6 Claims, 24 Drawing Sheets

(56)                    References Cited

U.S. PATENT DOCUMENTS

2016/0318803 A1*  11/2016  Pianaro ................. C04B 28/006
2018/0066192 A1*   3/2018  Bartek ..................... C10G 3/60

FOREIGN PATENT DOCUMENTS

JP           H5194007 A   *   8/1993
WO       WO-2018157239 A1 *   9/2018    ......... C04B 40/0616

OTHER PUBLICATIONS

CN107298563A Machine Translation (Year: 2017).*
Shakouri, M., et al., Hydration, strength, and durability of cementitious materials incorporating untreated corn cob ash. Construction and Building Materials, 2020. 243: p. 118171.
Ataie, F.F. and K.A. Riding, Use of bioethanol byproduct for supplementary cementitious material production. Construction and Building Materials, 2014. 51: p. 89-96.
Morissette, R., P. Savoie, and J. Villeneuve, Combustion of Corn Stover Bales in a Small 146- kW Boiler. Energies, 2011. 4.
Song, Z., et al., Comparison of Seven Chemical Pretreatments of Corn Straw for Improving Methane Yield by Anaerobic Digestion. PloS one, 2014. 9: p. e93801.
Ataie Feraidon, F. and A. Riding Kyle, Thermochemical Pretreatments for Agricultural Residue Ash Production for Concrete. Journal of Materials in Civil Engineering, 2013. 25(11): p. 1703-1711.
Shakouri, M., et al., Pretreatment of corn stover ash to improve its effectiveness as a supplementary cementitious material in concrete. Cement and Concrete Composites, 2020. 112: p. 103658.
Wardhani, G., N. Nurlela, and M. Azizah, Silica Content and Structure from Corncob Ash with Various Acid Treatment (HCI, HBr, and Citric Acid). Molekul, 2017. 12: p. 174.

\* cited by examiner

1

AGRICULTURAL WASTE ASH AS CEMENTITIOUS MATERIAL AND METHODS OF MAKING THE SAME

CROSS-REFERENCE TO RELATED APPLICATIONS

This application claims priority to U.S. Provisional Patent Application Ser. No. 63/299,298, filed on Jan. 13, 2022, which is herein incorporated by reference in its entirety.

BACKGROUND

Field

Embodiments of the present disclosure generally relate to cementitious materials. In particular, embodiments of the disclosure relates to cementitious materials made from agricultural waste ash and methods of fabricating agricultural waste ash-based cementitious material.

Description of the Related Art

Coal production is a highly energy-intensive process contributing to approximately 7% of the total industrial energy consumption and generation of 6% to 8% of greenhouse gas emissions worldwide. To mitigate the negative impact of cement production, supplementary cementitious materials (SCMs) are often used to partially replace Portland cement in concrete mixtures. Despite the favorable influence of SCMs, such as fly ash, slag, and silica fume, on the physical and durability properties of concrete masonry unit (CMU) blocks, currently available SCM resources are finite and can only met about 15% of the concrete industry demands worldwide.

For example, fly ash has been one of the most utilized SCMs in many countries. Fly ash, however, is an industrial by-product of coal-fired power plants. Due to the negative impacts of fossil fuels, there has been a paradigm shift in generating electricity, and many coal-fired plants have either shut down or resorted to cleaner fuels for power generation. In 2014, coal supplied 38.6% of the power needs for the United States. By 2019, this figure dropped to 23.4%, and is expected to drop to 10% or less by 2025. Due to recent environmental restrictions placed on coal-fired power plants, the available sources of fly ash have been considerably reduced.

Accordingly, what is needed in the art are more abundant and readily available SCM materials and methods for making the same.

SUMMARY

In at least one embodiment, a method of forming an agricultural waste ash supplementary cementitious materials (AWASCMs) is disclosed. The method includes pretreating agricultural waste with acid, burning the acid pretreated agricultural waste to form agricultural waste ash (AWA), heat treating the AWA, grinding the AWA into an AWA supplemental cementitious material (AWASCM), and mixing the AWASCM with cement, water, and supplementary cementitious materials (SCMs) to create a cement paste.

In another embodiment, a composition is disclosed. The composition includes sand, coarse aggregate, and cementitious materials. The cementitious materials includes cement, a supplementary cementitious material (SCM), and an agricultural waste ash supplementary cementitious material (AWASCM). The AWASCM includes an agricultural waste ash (AWA) and agricultural waste fibers (AWF).

In another embodiment, a method of making a concrete masonry unit is disclosed. The method includes pretreating agricultural waste with an acid, burning the acid pretreated agricultural waste to form agricultural waste ash (AWA), heat treating the AWA, grinding the AWA into an AWA supplemental cementitious material (AWASCM), mixing the AWASCM with cement, water, a supplementary cementitious materials (SCM), and an agricultural waste fiber (AWF) to create a cement paste, mixing the cement paste with coarse aggregate and sand to create a concrete, molding the concrete into a concrete masonry unit (CMUs) and curing the CMUs

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
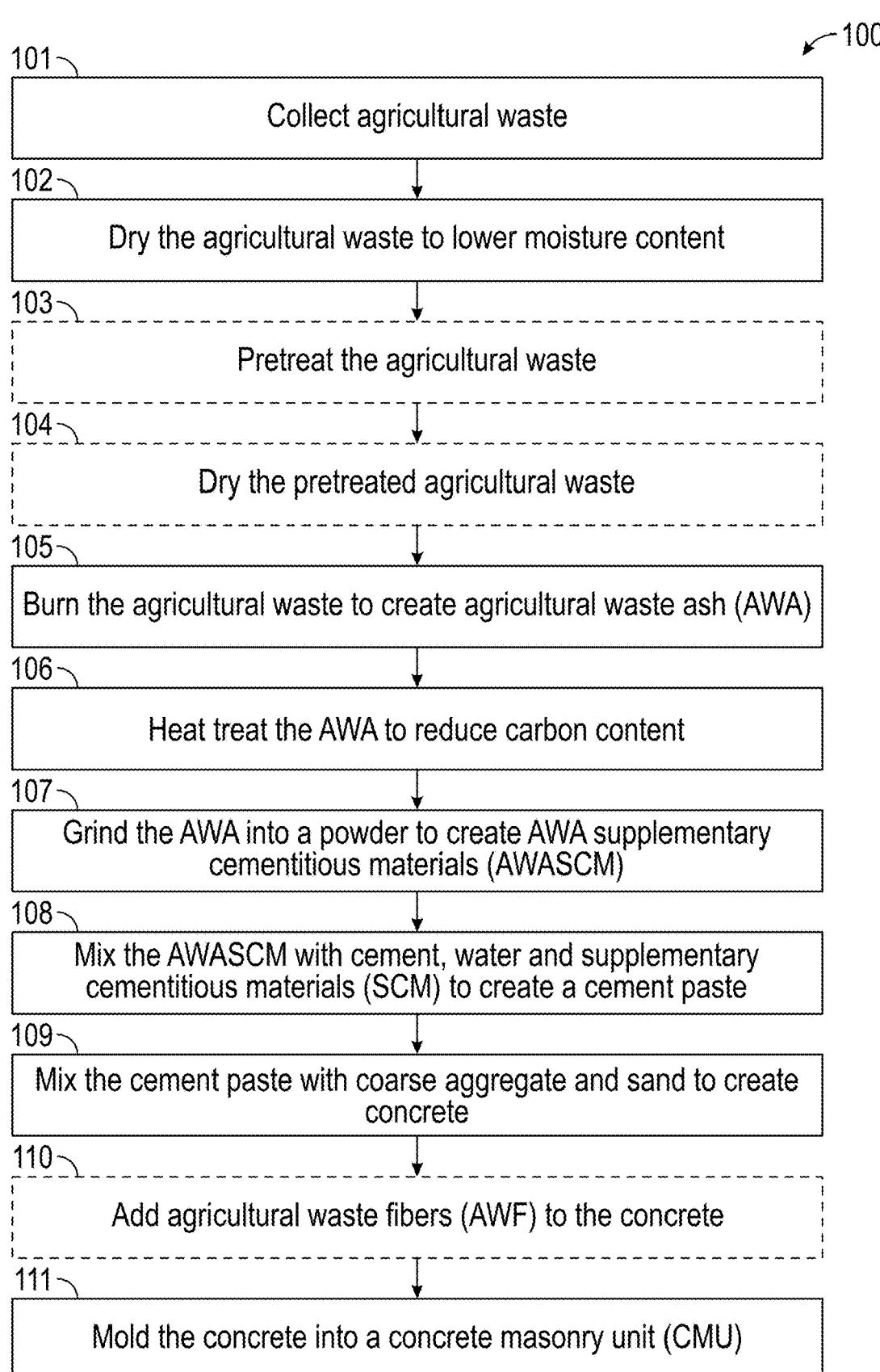
FIG. 1 is a flow diagram illustrating selected operations of a method of forming an agricultural waste ash supplemental cementitious material (AWASCM), according to embodiments of the disclosure.

Embodiments of the present disclosure generally relate to cementitious materials. In particular, the disclosure relates to cementitious materials made from agricultural waste ash and methods of fabricating the agricultural waste ash-based cementitious material.

The inventor has discovered processes for forming mortar and concrete masonry units, which can be used in various construction applications, using agricultural waste ash (AWA) and agricultural waste fibers (AWF) as a replacement to conventional supplementary cementitious materials (SCM). In contrast to conventional technologies, the AWA supplementary cementitious materials (AWASCM) have decreased environmental impact and improved mechanical properties when utilized in concrete applications.

The utilization of inexpensive agricultural waste, which can be found in abundance following a harvest, as a reliable source of supplementary cementitious materials (SCMs) provides a solution to the scarcity of conventional SCMs. Agricultural waste ash (AWA) from agricultural waste such as corn stover, corncob ash, rice husk, wheat straw, sugarcane bagasse ashes, and soy hulls, trigger the pozzolanic reactions and manifest cementitious properties when mixed with cement and water. The pozzolanic reaction is the reaction between pozzolans (e.g., siliceous or aluminous material) with calcium hydroxide ($Ca(OH)_2$) in the presence of water. The rate of the pozzolanic reaction is dependent on the intrinsic characteristics of the pozzolan such as the specific surface area, the chemical composition and the active phase content. The annual production of wheat, rice, and corn are 764, 495.9, and 1112.8 million metric tons, respectively. The substitution of a portion of cement with AWA can mitigate the negative environmental impacts of cement production in the concrete industry and can eliminate landfill issues associated with AWAs. In addition, AWAs can be burned at a considerably lower burning temperature, such as in the range of about 550° C. to about 700° C. In contrast, and as compared to cement clinker, an intermediary product in the SCM of ordinary Portland cement (OPC) is burned at a much higher temperature of about 1400° C. This reduction in the burning temperature for AWAs leads to lower production costs/energy consumption, which decreases the environmental impact of SCM production.

The use of headings is for purposes of convenience and does not limit the scope of the present disclosure. Embodiments described herein can be combined with other embodiments.

As used herein, a "composition" can include component(s) of the composition, reaction product(s) of two or more components of the composition, a remainder balance of remaining starting component(s), or combinations thereof. Compositions of the present disclosure can be prepared by any suitable mixing process.

Compositions

Embodiments described herein generally relate to cementitious material compositions formed with an agricultural waste ash supplementary cementitious material (AWASCM). The cement composition is can be formed using water and cementitious materials. The cementitious materials include cement, SCM, and AWASCM. Cement includes OPC, white Portland cement, or other cement material. The SCM includes fly ash (Class C and Class F), silica fume, slag, or other natural pozzolans. The standard specifications for ordinary Portland cement can be found in ASTM C150. The standard specification for blended hydraulic cements can be found in ASTM 595.

OPC and white Portland cement are formed from limestone and clay minerals. The limestone and clay minerals are heated in a kiln to form cement clinker. Cement clinker is formed by sintering the limestone and the aluminosilicate in the clay minerals. About 2 mass % to about 3 mass % of gypsum is added to the clinker, and the mixture is ground into a fine powder.

The AWASCM is formed using AWAs, such as corn stover ash (CSA), rice husk ash (RHA), rice straw ash, wheat straw ash, wood shavings ash, woodchips ash, sugarcane bagasse ash (SCBA), palm oil clinker, other AWAs, or combinations thereof.

In some embodiments, the AWASCM is formed using AWAs and agricultural waste fibers (AWF). AWFs can include corn fiber, rice husk fiber, wheat straw fiber, sugarcane bagasse fiber, and soy hull fiber. The AWFs are produced by separating the rind and pith of the agricultural waste stalks.

Fly ash is an industrial by-product of coal-fired power plants. Fly ash is composed of the particulates (fine particles of burned fuel) that are driven out of coal-fired boilers together with the flue gases. Class F fly ash is formed from burning harder, older anthracite and bituminous coal. Class C fly ash is formed from the burning of younger lignite or sub-bituminous coal and has some self-cementing properties. Class C fly ash generally contains more than 20 mass % lime ($CaO$). Alkali and sulfate ($SO_4$) contents are generally higher in Class C fly ashes.

Silica fume (e.g., microsilica) is an amorphous polymorph of silicon dioxide (e.g., silica). Silica is a by-product of silicon and ferrosilicon alloy production and consists of spherical particles with an average particle diameter of about 150 nm. Slag (e.g., granulated blast-furnace slag) is glassy, granular material formed when molten iron-blast furnace slag is rapidly chilled, typically by water sprays or immersion, and subsequently ground into a powder. Calcium carbonate ($CaCO_3$) is a substance found in rocks as the minerals calcite and aragonite (e.g., limestone).

The total mass of the cementitious materials is the total mass of the cement, the SCM, and the AWASCM. The total mass percentage of the cementitious materials does not exceed 100 mass percent. The total mass percent does not include water. In some embodiments, SCMs make up about 5 mass % to about 60 mass % of the total cementitious materials by mass, such as about 10 mass % to about 50 mass %, such as about 20 mass % to about 40 mass %. Any of the foregoing numbers can be used singly to describe an open-ended range or in combination to describe a close-ended range.

The total mass percentage of the SCMs is the total mass of the SCMs and AWASCMs. The total mass percentage of the SCMs materials does not exceed 100 mass percent. In some embodiments, the AWASCMs make up between about 0 mass % to about 100 mass % of the total SCMs, such as about 0 mass % and to about 30 mass % of the total SCMs.

The total mass percentage of AWASCMs is the total mass of the AWAs and AWFs. The total mass percentage of the AWASCMs does not exceed 100 mass percent. In some embodiments, the AWFs make up about 1 mass % to about 50 mass % of the total AWASCMs.

In some embodiments, the AWA is not pretreated before burning to create the AWASCM. In other embodiments, the AWA is pretreated before burning to create the AWASCM. The pretreatment methods include water pretreating and acid pretreating.

In some embodiments, the water pretreating includes ponding (e.g., soaking) the AWA in water for up to about two weeks. The water can be replaced one or more times during the ponding period in order to leach out water-soluble harmful chemical species and excess alkalis.

In some embodiments, the acid pretreating includes ponding (e.g., soaking) the AWA in acid for about two weeks. The acid can be replaced one or more times to during the ponding period in order to leach out harmful chemical species and excess alkalis. After ponding in acid, the AWAs are washed with water to stabilize the pH to 7.

In some embodiments, the acid used for acid pretreating can include an inorganic acid, an organic acid, or combinations thereof. Illustrative, but non-limiting, examples of inorganic acids include $H_2SO_4$, $HNO_3$, HBr, HI, $H_3PO_4$, Lewis acids (e.g., $FeCl_3$), an ion thereof, or combinations thereof. Illustrative, but non-limiting, examples of organic acids include $C_1$-$C_{25}$ carboxylic acid, such as a $C_3$-$C_{10}$ carboxylic acid such as $C_3$-$C_7$ carboxylic acid, such as oxalic acid, citric acid, formic acid, lactic acid, acetic acid, uric acid, malic acid, tartaric acid, trifluoroacetic acid, an ion thereof, or combinations thereof. Additionally, or alternatively, sulfonic acids such as $C_1$-$C_{25}$ sulfonic acid, such as a $C_3$-$C_{10}$ sulfonic acid, such as trifluorosulfonic acid, or combinations thereof can be utilized.

In some embodiments, the acid pretreating includes ponding (e.g., soaking) the AWA in one of hydrochloric acid (HCl), nitric acid ($HNO_3$), sulfuric acid ($H_2SO_4$), ethylenediaminetetraacetic acid (EDTA), acetic acid ($CH_3COOH$), citric acid ($C_6H_8O_7$), oxalic acid ($C_2H_2O_4$), or combinations thereof. The concentration of the acid used in the acid pretreating is from about 0.01M to about 5M, such as about 1M to about 3M. Any of the foregoing numbers can be used singly to describe an open-ended range or in combination to describe a close-ended range.

Pretreatment can affect the silica ($SiO_2$) content, ash surface area, calcium oxide ($CaO$) content, aluminum oxide ($Al_2O_3$) content of the AWAs. The $SiO_2$ content in the AWASCMs is greater than about 50 mass %, such as greater than about 60 mass %, such as greater than about 80 mass %. The calcium oxide content in the AWASCMs is less than about 10 mass %, such as less than about 6 mass %, such as less than about 3 mass %. The aluminum oxide content in the AWASCMs is about 2 mass % to about 10 mass %, such as about 3 mass % to about 8 mass %, such as about 4 mass % to about 6 mass %. The calcium-silicate hydrate (C—S—H) structure formed during the cement reaction form differently based on the amount of $SiO_2$ present in the mix. Increased $SiO_2$ leads to a lower Ca/Si ratio. The CaO content can affect the Ca/Si ratio, as well. The Ca/Si ratio influences the durability and mechanical properties of the resultant concrete. The aluminum oxide content influences the formation of the aluminum, ferric oxide, monosulfate (AFm) phases. AWAs have a lower calcium content than cement (e.g., OPC) creating a difference in the hydration products.

Water pretreating may remove inorganic elements from the AWA, such as chlorine (Cl⁻), and potassium oxide, as well as lower loss on ignition (LOI) of the AWAs. The LOI of the AWSCMs is typically less than about 5%, such as less than about 3%, such as less than about 2%. In some embodiments, the chlorine content of the AWASCMs is less than about 1 mass %, such as less than about 0.2 mass %. In some embodiments, the potassium oxide content of the AWSCMs is less than about 5 mass %, such as less than about 2.5 mass %, such as less than about 2 mass %. Water pretreatment may also increase the $SiO_2$ content. Pretreatment with HCl may increase the amorphous $SiO_2$ content within the AWA and effectively reduces the potassium oxide ($K_2O$) content of the AWA. HCl may further remove metallic impurities, deleterious alkalis, and organic matters. HCl and $H_2SO_4$ pretreatments may remove $P_2O_5$ content and reduce the crystallinity of the AWA. EDTA and $C_6H_8O_7$ may leach metal ions such as $K^+$, $Na^+$, $Ca^+$, and $Mg^+$ from the AWA.

The surface area and particle size distribution of the AWASCMs are linked to reactivity in the cement reaction and the fresh and hardened properties of the concrete mixture. The chemical composition of AWASCMs can influence the cement hydration, which in turn can affect the early stage properties of concrete, such as consistency, flow, and later-age properties such as compressive strength, porosity, diffusivity, and shrinkage of concrete. The specific surface area of an AWASCM can affect the strength development of the concrete. Higher surface area can enhance the reactivity and provides more hydration sites, leading to higher calcium hydroxide consumption and production of C—S—H. Acid pretreatment may decrease particle size and increase surface area of the AWASCM.

Crystallinity and amorphousness can influence the reactivity of the AWASCM. Crystalline $SiO_2$ is largely insoluble and non-reactive in concrete. Water and acid pretreated AWASCMs contain more amorphous phases of $SiO_2$ compared to untreated AWASCMs, leading to better performance in concrete. Water pretreated AWASCMs may contain small amounts of calcite and quartz crystalline phases. Acid pretreated AWASCMs may contain amorphous phases and do not contain sylvite, a major crystalline phase present in untreated AWAs. In some embodiments, a pretreated AWA that is burned at a temperature above about 600° C. has amorphous $SiO_2$ phases with a purity above 99%. Acid pretreatment with $H_2SO_4$, $HNO_3$, $C_6H_8O_7$, may remove crystalline phases such as potassium chloride (KCl). $HNO_3$ may also remove KCl and microline ($KAlSi_3O_8$) crystalline phases.

Acid pretreatment and water pretreatment influence the chloride permeability and pore size distribution of the concrete. Concrete made with the acid pretreated AWASCMs may contribute to lower chloride permeability and lower pore size distribution when compared to OPC. Acid pretreated AWASCMs also may also improve the compressive strength of the concrete, due to a low $Ca/SiO_2$ ratio of C—S—H gel. The chemical reaction between the AWASCMs and cement hydration products, such as calcium hydroxide ($Ca(OH)_2$ or portlandite), forms additional C—S—H that is primarily responsible for the engineering properties of concrete. Acid pretreating the AWAs may contribute to more C—S—H gel and less calcium hydroxide, thus improving the concrete.

Cementitious material, when mixed with cement, water, coarse aggregate, and sand, can form a concrete. Coarse aggregates include gravel, or crushed stone. Coarse aggregates can have a particle size greater than about 0.19 inches, such as from 0.375 inches to about 1.5 inches. Sand includes crushed gneiss, trap rock, limestone or granite. The particle sizes of sand are typically smaller than that of coarse aggregate. The coarse aggregates and sand can be make up about 60 mass % to about 75 mass % of the total volume of the concrete prior to the addition of water. The ratio of water to cementitious materials is from about 0.25:1 to about 0.75:1.

Concrete can be cured. Cured concrete is described herein as concrete where the moisture within the concrete is prevented from evaporating under heat and freezing under cold. As described below, cured concrete can be utilized for various applications including construction and building products, such as concrete masonry units.

Embodiments of the present disclosure also relate to methods of forming agricultural waste ash supplementary cementitious material (AWASCM) and to products formed with the AWASCM. Compositions of AWASCM and products formed with AWASCM can be made using methods described herein.

FIG. 1 is a flow diagram of a method 100 of forming an composition including AWASCMs. At operation 101, agricultural waste is collected. The agricultural waste may be one of corn stover waste, corncob waste, rice husk waste, wheat straw waste, sugarcane bagasse waste, soy hull waste, or combination thereof. At operation 102, the agricultural waste is dried to lower the moisture content. In some embodiments, the agricultural waste is dried to a moisture content less than about 25%, such as less than about 15%, such as less than about 10%. The agricultural waste may be dried using fans, low-heat ovens, or dried in ambient conditions. The moisture content is determined by comparing the weight of samples before and after drying.

At optional operation 103, the agricultural waste is pretreated. In some embodiments, the agricultural waste is pretreated using water, e.g., water pretreated for two weeks. In some embodiments, the water is replaced with fresh water after one week. In other embodiments, the agricultural waste is pretreated using acid, e.g., acid pretreated. In some further embodiments, the agricultural waste is water pretreated and acid pretreated. When water and acid pretreated, the agricultural waste is washed after the acid pretreatment with running water until reaching a stable pH of 7. The acid used for acid pretreating the agricultural waste includes one of hydrochloric acid (HCl), nitric acid ($HNO_3$), sulfuric acid ($H_2SO_4$), ethylenediaminetetraacetic acid (EDTA), citric acid ($C_6H_8O_7$), acetic acid ($CH_3COOH$), oxalic acid ($C_2H_2O_4$), or a combination thereof. In some embodiments, the agricultural waste is not pretreated.

At optional operation 104, the water pretreated and acid pretreated agricultural wastes are dried after pretreatment. In at least one embodiment, the agricultural waste is dried in an oven at 50° C. At operation 105, the agricultural waste is burned to create agricultural waste ash (AWA), e.g., untreated AWA, water treated AWA, and acid treated AWA. At operation 106, the AWA is heat treated to reduce the carbon content of the AWAs. In at least one embodiment, the heat treatment is performed from about 500° C. to about 1500° C., such as about 550° C. or about 1000° C. At operation 107, the AWAs are ground into a powder to create an agricultural waste ash supplementary cementitious material (AWASCM). In at least one embodiment, a mortar and pestle are used to grind the AWAs into AWASCMs. In other embodiments, mechanical grinders are used to grind the AWAs into AWASCMs. In at least one embodiment, the AWASCMs have particle sizes less than about 100 microns, such as less than about 50 microns, such as about 30 microns. In another embodiment, the surface area of the AWASCMs is from about 500 m²/kg to about 2000 m²/kg. In some embodiments, the untreated AWASCMs have a surface area from about 600 m²/kg to about 1100 m²/kg, such as about 800 m²/kg. In some embodiments, the water pretreated AWASCMS have a surface area of about 1500 m²/kg to about 2000 m²/kg, such as about 1700 m²/kg. IN

9 some embodiments, the acid pretreated AWASCMs have a surface area of about 1200 m²/kg to about 1700 m²/kg, such as about 1500 m²/kg.

At operation 108, the AWASCMs are mixed with cement, water, and supplementary cementitious materials (SCMs) to create a cement paste. The cement paste is generally a dispersion of the components in water. The SCMs and AWASCMs replace about 5 mass % to about 20 mass % of the total cementitious materials. In some embodiments, the AWASCMs (or AWASCM and AWF mixture) replaces about 0 mass % to about 30 mass % of the total SCMs. The ratio of water to cementitious materials is from about 0.25:1 to about 0.75:1. In some embodiments, the AWASCMs (or AWASCM and AWF mixture) are hand-mixed. In other embodiments, the AWASCMs (or AWASCM and AWF mixture) are mixed using a mechanical mixer.

At operation 109, the cement paste is mixed with the coarse aggregate and sand to create a concrete. The ratio of cementitious materials to sand is from about 0.3:1 to about 0.6:1, such as about 0.4:1 to about 0.5:1. The ratio of cementitious material to coarse aggregate is about 0.2:1 to about 0.4:1, such as about 0.03:1. Any of the foregoing numbers can be used singly to describe an open-ended range or in combination to describe a close-ended range.

At optional operation 110, agricultural waste fibers (AWFs) are added to the concrete. AWFs can include corn fiber, rice husk fiber, wheat straw fiber, sugarcane bagasse fiber, soy hull fiber, coconut fiber, hemp fiber, and bamboo fiber. The AWFs are produced by separating the rind and pith of the agricultural waste stalks. The rind is washed with water and dried. In at least one embodiment, the rind is dried in an oven to a constant weight at a temperature from about 100° F. to about 200° F., such as about 150° F. The dried rind is cut into strips. In at least one embodiment, the strips are from about 0.5 inches to about 5 inches, such as from about 1 inch to about 2 inches. In one embodiment, in order to decompose the lignin in the AWFs, the strips can be soaked in a solution under acidic conditions (e.g., treatment in a solution with a pH of about 4 to about 5) for an hour at about 150° C. to about 175° C. In one or more embodiments, the solution is a sodium chlorite (NaClO₂) solution. In another embodiment, in order to decompose the lignin in the AWFs, the strips can be soaked in a solution under basic conditions (e.g., treatment in a solution with a pH greater than 7). In at least one embodiment, the basic treatment is performed at elevated temperatures. The base used for basic treating the AWFs includes one of sodium hydroxide, potassium hydroxide, calcium hydroxide, or a combination thereof. In at least one embodiment, the crushed strips are exposed to 0.5% sodium hydroxide at 175° F. for about 30 minutes to about 24 hours. The AWFs have an AWASCM replacement level of about 0.5 mass % to about 5 mass %. The addition of AWFs to the AWASCMs increases the modulus of elasticity and the tensile strength of concrete, as well as improves the ability of the concrete to resist cracking.

At operation 111, the concrete is molded into a concrete masonry unit (CMUs). In at least one embodiment, the CMU is an 8 in×8 in×16 in CMU. The concrete can be cured by various techniques, such as wet burlaps, water spray, or steam. In some embodiments, the CMUs cure from about 4 hours to about 28 days, such as about 7 days or about 14 days. Elevated temperatures for curing can be used, such as from about 100° F. to about 160° F.

Uses

Embodiments of the present disclosure also generally relate to uses of the compositions described herein. Compositions described herein can also be used for various applications such as cement, grout, mortar, or other construction binders, among other applications. Generally, the compositions can be cured, as described herein, to form desired articles such as construction and building products such as concrete masonry units, bricks, walls, pilings, poles, posts, columns, or other structures or installations, including articles used for residential and commercial structures or installation.

Illustrative, but non-limiting, applications include concrete masonry units such as cinder blocks, breezeblocks, bricks, hollow blocks, concrete blocks, construction blocks, Besser blocks, clinker blocks, bricks, among other concrete masonry units.

The following examples are put forth so as to provide those of ordinary skill in the art with a complete disclosure and description of how to make and use embodiments of the present disclosure, and are not intended to limit the scope of embodiments of the present disclosure. Efforts have been made to ensure accuracy with respect to numbers used by some experimental errors and deviations should be accounted for.

EXAMPLES

Test Methods

Mass percentage was determined using Epsilon 4 Malvern Panalytical X-Ray fluorescence spectrometer. For this purpose, 0.6 g of the AWASCM was mixed with 6 g of lithium tetraborate and fused into a glass bead using a LeNeo fusion instrument.

Scanning electron microscopy (SEM) was conducted using an energy dispersive x-ray spectroscopy JEOL 6500. The ashes were dusted onto a double-sided carbon tape, and imaging was performed in the secondary electron mode at 5-kV and 500 times magnification.

Loss on ignition (LOI) refers to the percentage of volatiles that oxidize at a temperature between about 1652° F. and about 1832° F. LOI was determined using a muffled furnace.

Chlorine content, $P_2O_5$ content, $K_2O$ content, and $SiO_2$ content was determined using Epsilon 4 Malvern Panalytical X-Ray fluorescence spectrometer.

Acid solutions and base solutions are aqueous solutions.

Experimental

Table 1 shows the effects of pretreatment of example AWASCMs samples. The AWASCMs include AWAs, such as rice husk ash, rice straw ash, corn stover ash (CSA), wood shavings ash, wheat straw ash, sugarcane bagasse ash (SCBA), and palm oil clinker powder (POCP) ash. The values shown in Table 1 are in mass percentage (% mass).

The acid pretreatment of rice and straw ash with HCl increased the amount of $SiO_2$ by about 9 mass % and about 19 mass %, respectively. The HCl pretreatment also effectively reduced the $K_2O$ content of SCBA. HNO₃ and water pretreating reduced the LOI, as well as the chlorine content and $K_2O$ content, of CSA. Although the water pretreatment removed some of the soluble $K_2O$, the resulting ash still had high $K_2O$ content. HCl and $H_2SO_4$ pretreatments removed the $P_2O_5$ content and reduced the crystallinity of CSA.

TABLE 1

Effects of pretreatment of RHA, rice straw, CSA, wood shavings, wheat straw, SCBA, and palm oil powder on the composition and on physical properties of corresponding ash.

| Agriculture Waste | Pre-treatment | | $K_2O$ | Cl | $P_2O_5$ | LOI | $SiO_2$ |
|---|---|---|---|---|---|---|---|
| | HCl | Untreated | 0.618 | 0.01 | 0.46 | — | 95.77 |
| | | Treated | 0.018 | 0.01 | 0.11 | — | 99.58 |
| | $H_2SO_4$ | Untreated | 0.618 | 0.01 | 0.46 | — | 95.77 |
| | | Treated | 0.016 | — | 0.13 | — | 99.08 |
| | HCl | Untreated | 2.80 | — | 0.68 | — | 90.00 |
| | | Treated | 0.06 | — | 0.11 | — | 99.00 |
| RHA | HCl | Untreated | 2.54 | 0.01 | 0.18 | 2.31 | 92.40 |
| | | Treated | 0.16 | 0.11 | 0.51 | 2.65 | 96.00 |
| | HCl | Untreated | 2.51 | — | — | 1.85 | 88.47 |
| | | Treated | 0.06 | — | — | 2.10 | 97.49 |

TABLE 1-continued

Effects of pretreatment of RHA, rice straw, CSA, wood shavings,
wheat straw, SCBA, and palm oil powder on the composition and
on physical properties of corresponding ash.

| Agriculture Waste | Pre-treatment | $K_2O$ | Cl | $P_2O_5$ | LOI | $SiO_2$ |
|---|---|---|---|---|---|---|
| | $HNO_3$ | Untreated | 2.51 | — | — | 1.85 | 88.47 |
| | | Treated | 0.26 | — | — | 3.42 | 95.83 |
| | $CH_3COOH$ | Untreated | 2.51 | — | — | 1.85 | 88.47 |
| | | Treated | 0.14 | — | — | 2.36 | 95.58 |
| | $C_2H_2O_4$ | Untreated | 2.51 | — | — | 1.85 | 88.47 |
| | | Treated | 0.05 | — | — | 2.71 | 94.42 |
| Rice straw | HCl | Untreated | 5.18 | — | — | 5.30 | 79.10 |
| | | Treated | 0.31 | — | — | 1.65 | 88.20 |
| | Water-washed | Untreated | 25.41 | — | 6.78 | 22.78 | 28.42 |
| | | Treated | 10.56 | — | 6.06 | 10.64 | 47.37 |
| | HCl | Untreated | 25.41 | — | 6.78 | 22.78 | 28.42 |
| | | Treated | 4.41 | — | 3.34 | 3.82 | 77.94 |
| CSA | Water-washed | Untreated | 22.70 | 1.90 | 3.74 | 9.04 | 49.00 |
| | | Treated | 8.82 | 0.53 | 1.79 | 4.01 | 64.80 |
| | $HNO_3$ | Untreated | 22.70 | 1.90 | 3.74 | 9.04 | 49.00 |
| | | Treated | 0.94 | 0.02 | 0.39 | 0.16 | 85.70 |
| Wood shavings | Vitrification | Untreated | — | — | — | — | — |
| | | Treated | 7.50 | 0.01 | 2.9 | 26.50 | — |
| Wheat straw | HCl | Untreated | 14.70 | — | — | — | 66.30 |
| | | Treated | 1.54 | — | — | — | 86.50 |
| SCBA | HCl | Untreated | 24.70 | — | 3.97 | 0.50 | 43.20 |
| | HCl | Treated | 1.50 | — | 2.64 | 0.30 | 76.00 |
| Palm oil Powder | | Untreated | 17.70 | — | 3.97 | 0.02 | 55.39 |
| | | Treated | 14.84 | — | 2.64 | — | 60.23 |

Figures 2A, 2B:
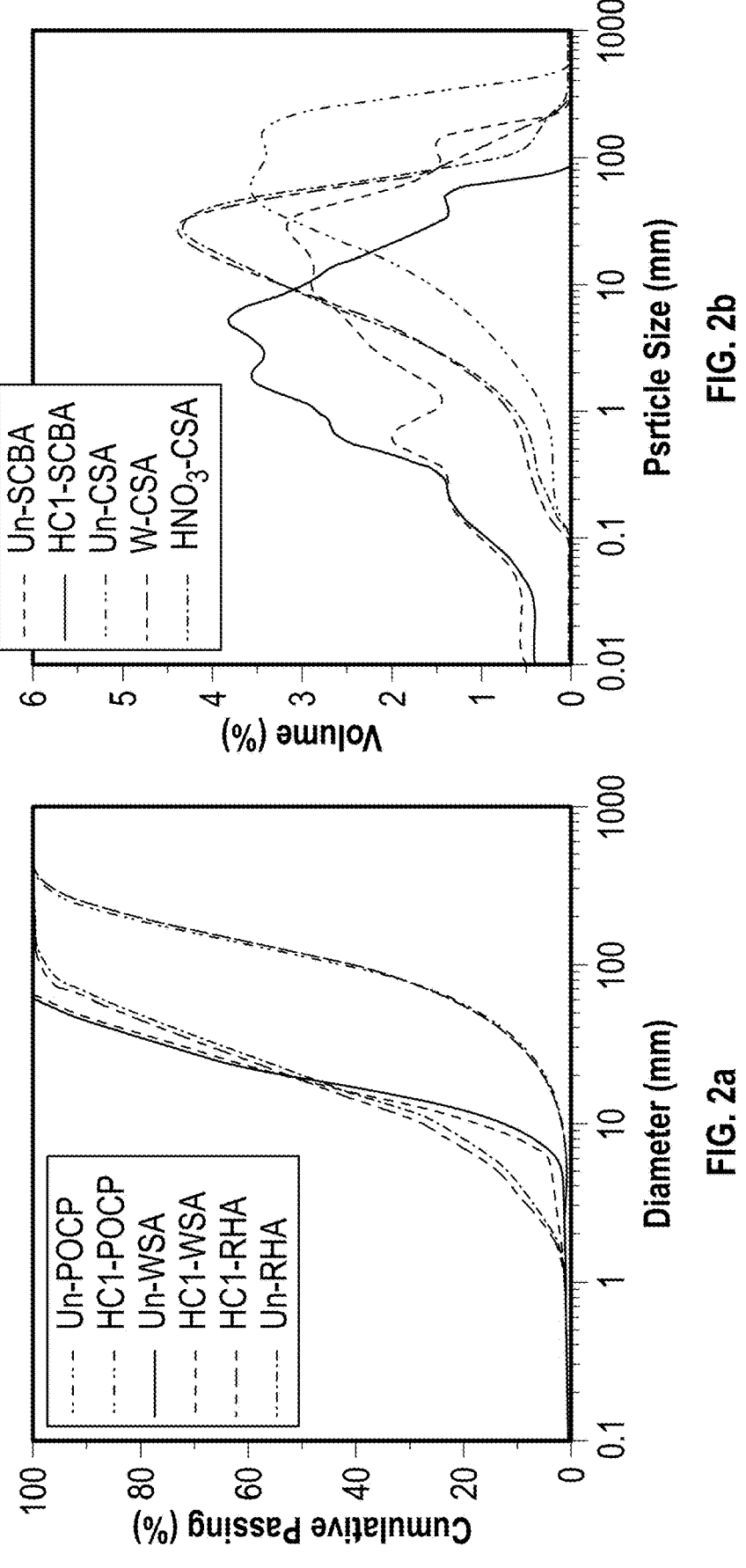
FIG. 2a illustrates the particle size distribution of untreated and pretreated agricultural waste ashes (AWAs) by cumulative passing, according to embodiments of the disclosure.
FIG. 2b illustrates the particle size distribution of untreated and pretreated agricultural waste ashes (AWAs) by volume, according to embodiments of the disclosure.

FIGS. 2a and 2b show the particle size distribution of untreated and pretreated example AWASCMs samples. Specifically, FIG. 2a shows the particle size distribution of untreated and pretreated AWASCMs by cumulative passing and FIG. 2b shows the particle size distribution of untreated and pretreated AWASCMs by volume. The particle size distribution is a list of values or a mathematical function that defines the relative amount, typically by mass, of particles present according to size. Cumulative passing particle size distribution is showing for each size of particles what percentage of the sample has a size smaller than or equal to the value in x-axis. Particle size distribution by volume is the distribution per volume of the particle sizes, shown as a frequency of total volume of all counts. In FIG. 2a, the samples include untreated palm oil clinker powder (Un-POCP), HCl pretreated POCP (HCl-POCP), untreated wheat straw ash (Un-WSA), HCl pretreated WSA (HCl-WSA), untreated rice husk ash (Un-RHA), and HCl pretreated RHA (HCl-RHA). FIG. 2b shows that acid pretreated SCBA with dilute HCl results in ashes with finer particle sizes. The samples in FIG. 2b include untreated sugarcane bagasse ash (Un-SCBA), HCl pretreated SCBA (HCl-SCBA), untreated corn stover ash (Un-CSA), water pretreated CSA (W-CSA), and HCl pretreated CSA (HCl-CSA). Acid pretreated and water pretreated CSA had smaller median particle sizes than the untreated CSA. The average particle sizes for $HNO_3$ pretreated, water pretreated, and untreated CSA were about 18.8 μm, about 17.2 μm, and about 54.8 μm, respectively. Acid pretreatment may reduce the $K_2O$ content, leading to the formation of less sylvite (potassium chloride) in the ash during the combustion process. A high potassium content can cause particle agglomeration with increases hardness, thereby yielding finer ash, e.g., smaller particle sizes.

Figure 3:
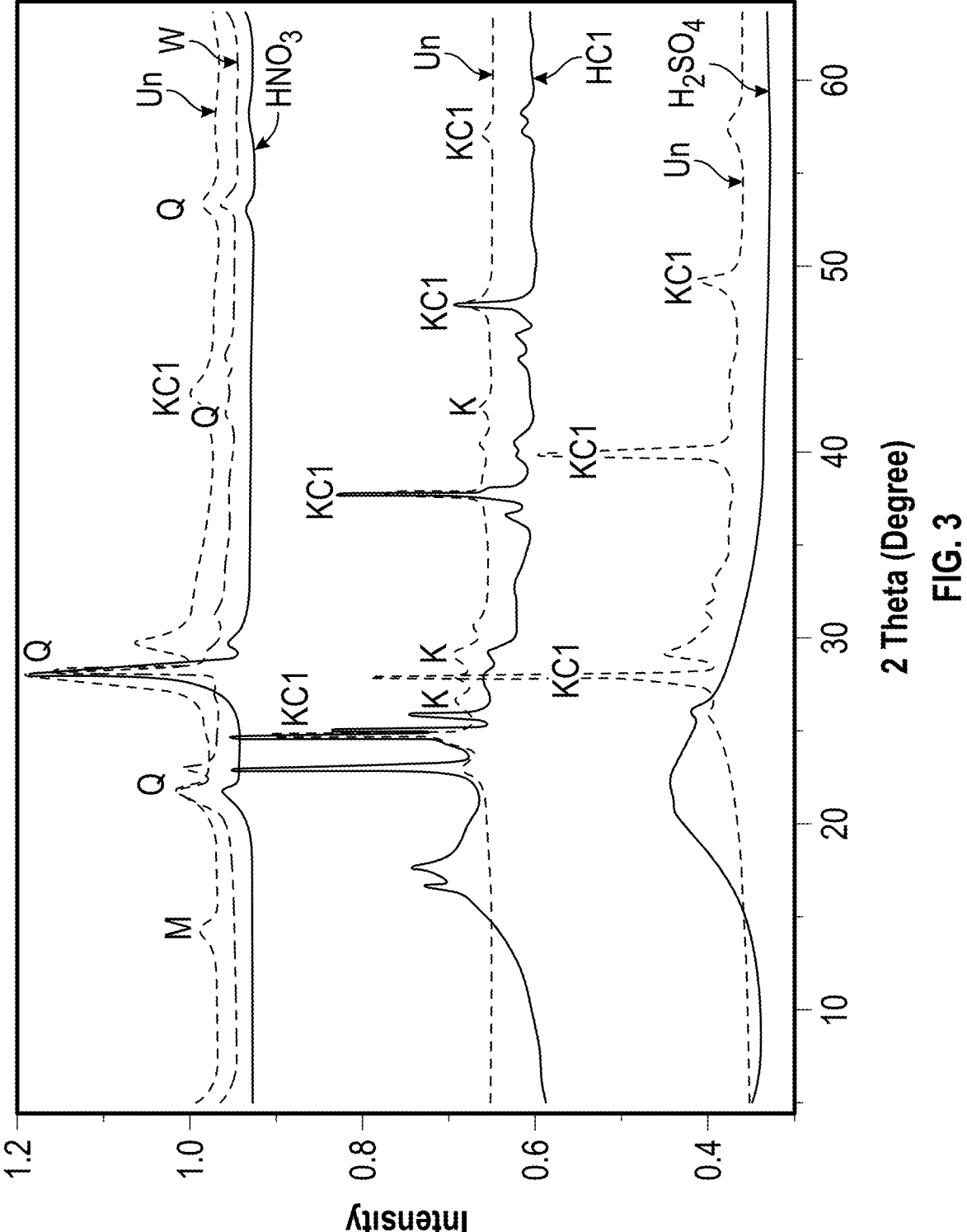
FIG. 3 illustrates the influence of the pretreatment methods on the crystalline phase composition of corn stover ash (CSA) samples measured using x-ray diffraction (XRD), according to embodiments of the disclosure.

FIG. 3 shows the influence of the pretreatment methods on the crystalline phase composition of CSA samples measured using x-ray diffraction (XRD). In some embodiments, the XRD was performed using a Briker D8 Discover DaV-inci. The x-ray tube functioned at 40 kV with a current of 400 mA. The diffraction patterns were recorded in the 2θ range of 10°-70° and analyzed using the Bruker DIFFRAC EVA software loaded with the Crystallography Open Data-base (COD). The CSA samples shown are untreated CSA (Un) and water pretreated CSA (W). The peaks correspond to microline (M), $SiO_2$ (Q), potassium chloride (KCl), and potassium (K). $H_2SO_4$ pretreated CSA samples had all the crystalline phases removed, such as potassium chloride (sylvite), as compared to the untreated CSA. $HNO_3$ also removed the potassium chloride and microline ($KAlSi_{3}O_8$) from CSA. Water pretreated CSA had more calcite and quartz crystalline phases that acid pretreated CSA. CSA pretreated with HCl contained amorphous phases, and $H_2SO_4$ pretreated CSA did not contain potassium chloride. Amorphous phases are HCl did not fully remove the potassium chloride. Wheat and rice straw ash acid pretreated with $H_2SO_4$ removed all crystalline phases. RHA pretreated with HCl and $H_2SO_4$ burned at a temperature above 600° C. contained amorphous $SiO_2$ phases with a purity above 99%. Acid pretreated CSA contained more amorphous phases compared to untreated or water pretreated samples.

Figure 4:
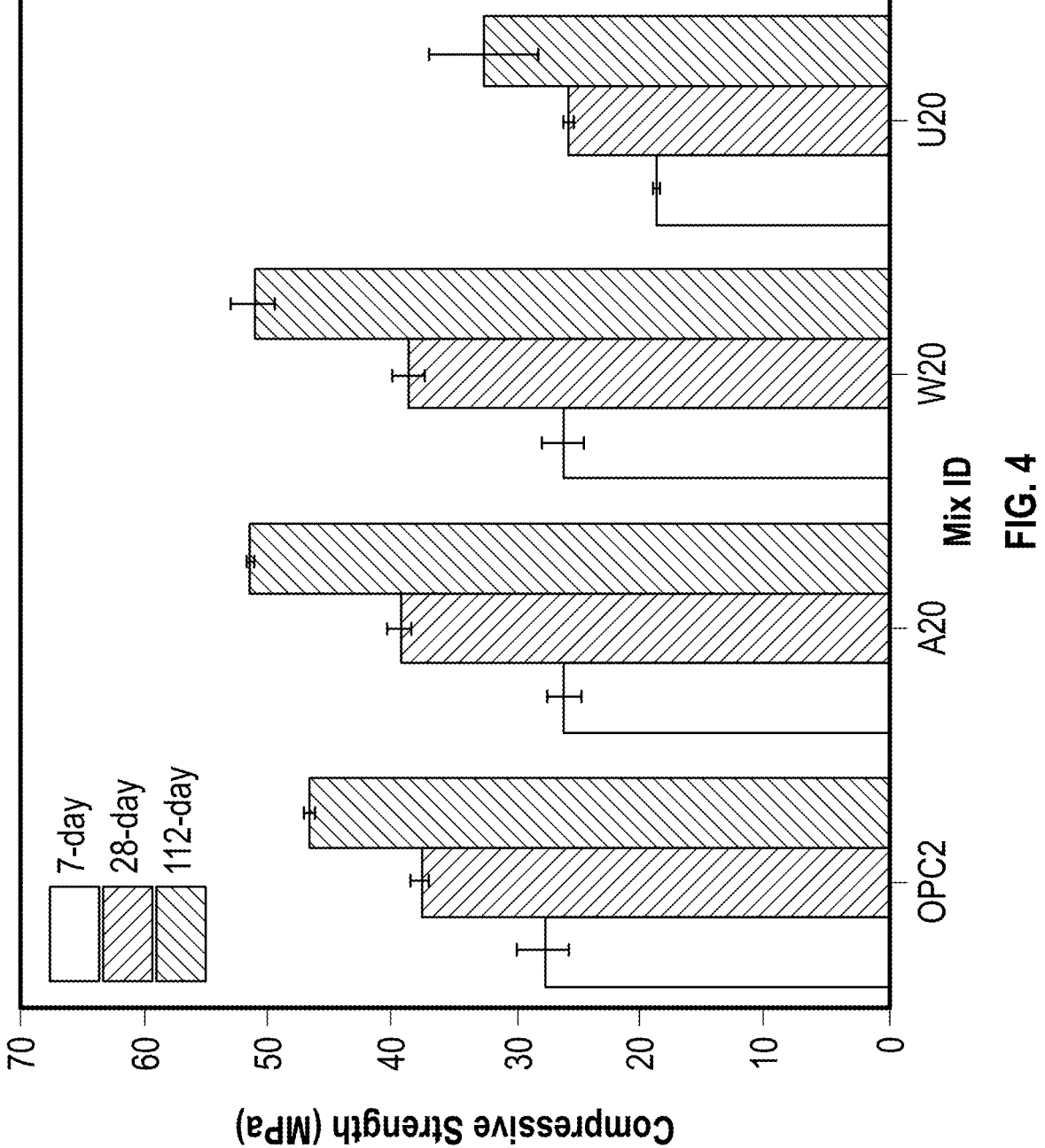
FIG. 4 illustrates the compressive strength of concrete specimens with CSA, according to embodiments of the disclosure.

FIG. 4 shows the compressive strength (in megapascals (MPa)) of example concrete specimens with CSA. The specimens had a SCM replacement rate of 20 mass % CSA SCMs and were tested at 7-day, 28-day, and 112-day increments. The specimens included only OPC (OPC2), acid pretreated CSA (A20), water pretreated CSA (W20), and untreated CSA (U20). A replacement rate of 20 mass % CSA increased the compressive strength of cement by 10 mass % compared to OPC. Replacing 5 mass % to 15 mass % of OPC with the acid pretreated RHA resulted in a concrete compressive strength increase up to 43%. In samples using CSA, as shown in FIG. 4, with acid pretreated CSA showed an increase of 4.7 MPa (10.2% improvement) and the water pretreated CSA showed an increase of 4.5 MPa (9.6%) over the untreated OPC sample. The higher $SiO_2$ content of the acid pretreated AWASCMs leads to a low $Ca/SiO_2$ ratio of C—S—H gel that has beneficial effects on the concrete mechanical and durability properties. The chemical reaction between the AWASCMs and cement hydration products, mainly calcium hydroxide ($Ca(OH)_2$), forms additional C—S—H, which is primarily responsible for the engineering properties of concrete. XRD analysis for hydration pastes made from pretreated RHA showed more C—S—H gel and less CH, enhancing concrete structure. HCl pretreated RHA had very low chloride permeability and lower pore size distribution as compared to OPC.

Figure 5:
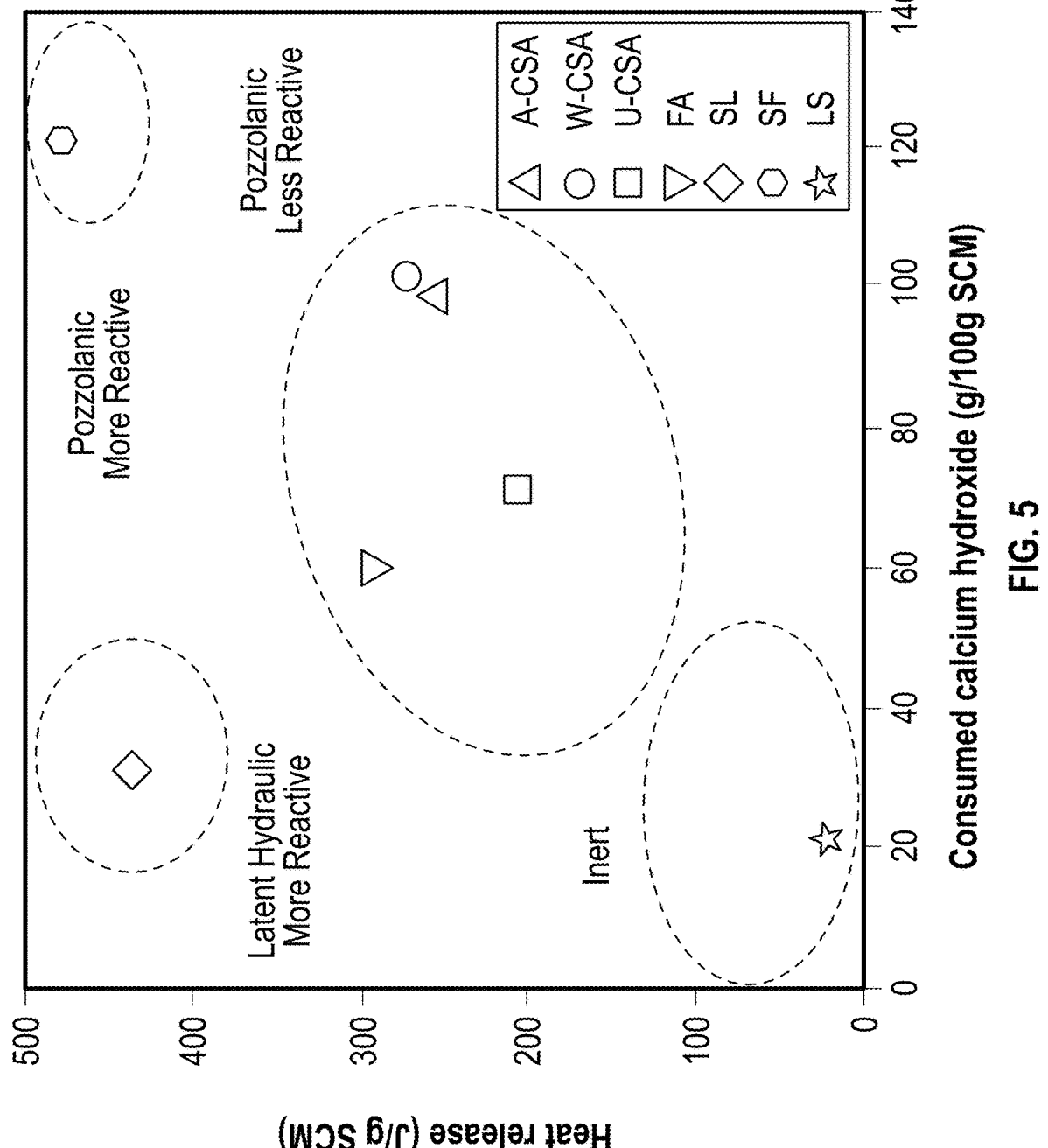
FIG. 5 illustrates the pozzolanic reactivity of CSA, according to embodiments of the disclosure.

FIG. 5 shows the pozzolanic reactivity of CSA. Shown in FIG. 5 are SCMs made from acid pretreated CSA (A-CSA), water pretreated CSA (W-CSA), untreated CSA (U-CSA), fly ash (FA), slag (SL), silica fume (SF), and limestone (S). Latent hydraulic, such as slag, is a material that is not hydraulic of itself but may become hydraulic when exposed to calcium-rich solutions. Inert material is a material that does not participate in the cement hydration process. In one embodiment, the inert material is quartz. Table 2 shows the impact of pretreated AWASCMs on concrete properties. The inclusion of $HNO_3$ pretreated CSA and HCl pretreated RHA reduced the workability of the concrete. Most pretreated AWASCMs improved the strength of concrete due to the reaction with calcium hydroxide to create more C—S—H. Pozzolanic reactivity, measured based on calcium hydroxide consumption, increased after inclusion of AWASCMs in some mix designs, e.g., 20% replacement CSA pretreated with HCl, $H_2SO_4$, and $HNO_3$, 5% replacement level CSA pretreated with $HNO_3$, 2.5% and 5% replacement level SCBA pretreated with HCl, and 2.5% and 15% replacement level palm oil clinker pretreated with HCl. Pozzolanic reactivity decreased in the mix design with woodchips that were pretreated with vitrification. The reactivity of CSA increased when the CSA was pretreated due to an increase in the $SiO_2$ content, reduction in the amount of impurities, and a decrease in the median particle size, as will be discussed in further detail below. CSA increases the long-term strength of concrete.

TABLE 2

| Agriculture Waste | Pretreatment | Replacement level (%) | w/c | Work Ability | Compressive strength | Pozzolanic reactivity | Shrinkage |
|---|---|---|---|---|---|---|---|
| CSA | HC1 and H₂SO₄ | 20 | 0.55 | — | ↑ | ↑ | — |
| CSA | HNO₃ | 5 & 20 | 0.45 & 0.54 | ↓ | ↑ | ↑ | — |
| RHA | HC1 | 5 to 20 | 0.45 | ↓ | ↑↓ | — | — |
| Rice and wheat straw | HC1 | 20 | 0.55 | — | ↑ | — | — |
| Rice husk | HC1 | 10 | 0.55 | — | ↑ | — | — |
| Wood shavings | Coating | 23 & 46 | 0.6 & 0.7 | — | ↑ | — | ↑ |
| Woodchips | Vitrification | 30 | 0.50 | — | ↑ | ↓ | — |
| SCBA | HCI | 2.5 & 5 | 0.72 | — | ↑ | ↑ | — |
| Palm oil clinker | HCI | 2.5 to 15 | 0.70 | — | ↓ | ↑ | — |

The effects of pretreated AWASCMs on concrete properties.

Table 3 shows the chemical composition of untreated CSA by mass percent (% mass). Harvested CSA was collected from four different corn farms in Nebraska (NE1, NE2) and Iowa (IA1, IA2), USA. The IA2 sample contains high amounts of chloride, which can be attributed to the application of pesticides.

TABLE 3

Chemical composition of untreated CSA (% mass).

| Source | SiO₂ | Al₂O₃ | CaO | P₂O₅ | Fe₂O₃ | SO₃ | Cl | MgO | K₂O | Na₂O | L.O.I |
|---|---|---|---|---|---|---|---|---|---|---|---|
| NE1 | 64.76 | 5.61 | 3.83 | 1.97 | 1.43 | 0.36 | 0.15 | 2.01 | 7.81 | 0.71 | 10.84 |
| NE2 | 58.80 | 6.39 | 4.33 | 1.99 | 2.17 | 0.52 | 0.04 | 2.46 | 11.98 | 0.59 | 10.18 |
| IA1 | 64.01 | 6.24 | 3.23 | 0.62 | 2.04 | 0.14 | 0.17 | 2.75 | 4.90 | 0.56 | 14.76 |
| IA2 | 43.03 | 1.95 | 6.00 | 1.83 | 0.66 | 0.37 | 1.51 | 5.98 | 18.36 | 0.29 | 19.81 |

The CSA was air-dried to a moisture content of approximately 10 mass % and divided into three batches. The first batch was burned without pretreatment (untreated CSA). The second batch of CSA was water pretreated by soaking the CSA in water (CSA: solution ratio of 1:10) for two weeks. The water was replaced with fresh water after 7 days. After water pretreatment, the second batch was dried in an oven at 50° C. and burned in open air (water pretreated CSA). The third batch of CSA was water pretreated by soaking the CSA in water (CSA:solution ratio of 1:10) for two weeks. The water was replaced with fresh water after 7 days. After two weeks of water pretreatment, the water was replaced with a pretreatment acid and soaked for two weeks. After two weeks, the third batch was washed with running water until the pH is stabilized at 7, dried in an oven at 50° C., and burned in open air (acid pretreated CSA). The ashes from the untreated CSA, water pretreated CSA, and acid pretreated CSA were reheated at 550° C. in a muffle furnace for an hour to reduce the carbon content of the ashes. The ashes were ground using a mortar and pestle and tested using x-ray fluorescence (XRF). Scanning electron microscopy (SEM) was conducted using an energy dispersive x-ray spectroscopy JEOL 6500. The ashes were dusted onto a double-sided carbon tape, and imaging was performed in the secondary electron mode at 5-kV and 500 times magnification.

The chemical compositions of the CSA are shown above in Table 3. Untreated CSA is mainly composed of SiO₂, CaO, and Al₂O₃. Untreated CSA, water pretreated CSA, and acid pretreated CSA all have SiO₂ content less than 65% by mass. Untreated CSA has a lower SiO₂ content than rice husk ash and rice ash, comparable SiO₂ content with wheat straw, and a higher SiO₂ content than SCBA. Removal of P₂O₅ from the agricultural waste beneficially affects the setting time and early strength of concrete. P₂O₅ content greater than 1% by mass in OPC reduces the compressive strength of concrete at early stages. The average P₂O₅ of untreated CSA is 1.6 mass %. The average Cl content of untreated CSA is 0.47 mass %. The IA2 CSA contained high amounts of Cl, 1.51 mass %, due to pesticides and weed exterminators during tillage. Products such as atrazine contain high amounts of Cl, which can be uptaken by the plants. Untreated CSA contained considerable amounts of alkali oxides. High amounts of alkali oxides impact initial and final setting times, soundness of the cement, and mechanical and durability performance of concrete. The average K₂O and Na₂O contents for untreated CSA were 10.76 mass % and 0.54 mass %.

Table 4 shows the oxide analysis of water and acid pretreated CSAs. The table shows the Nebraska samples NE1, NE2, NE3 and Iowa samples IA1, IA2 of CSA when treated with water (W), HNO₃ (N), H₂SO₄ (S), HCl (H), and C₆H₈O₇ (C).

TABLE 4

Chemical compositions of pretreated CSA after pretreatment regimes (% mass).

| Treatment | Source | SiO$_2$ | Al$_2$O$_3$ | CaO | P$_2$O$_5$ | Fe$_2$O$_3$ | SO$_3$ | Cl | TiO$_2$ | K$_2$O | Na$_2$O | L.O.I |
|---|---|---|---|---|---|---|---|---|---|---|---|---|
| W | NE 1 | 73.85 | 4.80 | 5.35 | 0.88 | 1.08 | 0.17 | 0.07 | 0.29 | 2.04 | 0.77 | 8.68 |
|  | NE 2 | 67.50 | 7.24 | 8.81 | 1.08 | 2.12 | 0.20 | 0.21 | 0.37 | 4.70 | 1.05 | 4.04 |
|  | NE 3 | 65.77 | 4.95 | 6.94 | 0.93 | 1.00 | 0.23 | 0.13 | 0.23 | 4.03 | 0.79 | 13.20 |
|  | IA 1 | 74.08 | 2.71 | 8.08 | 0.82 | 0.80 | 0.34 | 0.05 | 0.22 | 3.37 | 0.66 | 6.29 |
|  | IA 2 | 74.69 | 5.49 | 4.45 | 0.76 | 1.68 | 1.10 | 0.10 | 0.31 | 3.88 | 1.45 | 3.90 |
| N 0.1 | NE 1 | 76.05 | 5.31 | 1.90 | 0.69 | 1.01 | 0.18 | 0.07 | 0.29 | 1.18 | 0.76 | 11.74 |
|  | NE 2 | 75.24 | 6.34 | 3.50 | .073 | 1.74 | 0.15 | 0.04 | 0.34 | 1.91 | 1.64 | 7.22 |
|  | NE 3 | 80.10 | 5.00 | 3.50 | 0.80 | 0.99 | 0.19 | 0.08 | 0.23 | 4.25 | 1.39 | 2.12 |
|  | IA 1 | 77.23 | 3.27 | 3.67 | 0.60 | 0.89 | 2.02 | 0.04 | 0.23 | 1.93 | 0.79 | 7.75 |
|  | IA 2 | 79.69 | 4.15 | 1.28 | 0.62 | 1.02 | 0.95 | 0.05 | 0.25 | 1.20 | 3.43 | 6.72 |
| N 1 | NE 1 | 81.43 | 6.91 | 1.32 | 0.37 | 1.03 | 0.48 | 0.04 | 0.33 | 1.12 | 1.13 | 5.18 |
|  | NE 2 | 78.28 | 6.67 | 2.69 | 0.58 | 1.56 | 0.24 | 0.04 | 0.33 | 1.60 | 1.91 | 5.06 |
|  | NE 3 | 82.84 | 5.11 | 2.05 | 0.34 | 0.93 | 0.16 | 0.05 | 0.23 | 2.26 | 1.42 | 3.82 |
|  | IA 1 | 73.82 | 5.36 | 2.99 | 0.32 | 0.68 | 0.25 | 0.04 | 0.19 | 1.26 | 0.78 | 13.20 |
|  | IA 2 | 82.37 | 3.27 | 0.63 | 0.18 | 0.64 | 0.64 | 0.07 | 0.19 | 0.72 | 3.34 | 7.58 |
| N3 | NE 1 | 80.14 | 6.14 | 1.22 | 0.31 | 0.90 | 0.22 | 0.04 | 0.28 | 0.93 | 1.39 | 7.87 |
|  | NE 2 | 83.08 | 8.09 | 1.58 | 0.34 | 1.58 | 0.16 | 0.04 | 0.33 | 1.25 | 1.63 | 1.18 |
|  | NE 3 | 76.18 | 7.42 | 3.21 | 0.50 | 0.91 | 0.20 | 0.05 | 0.22 | 3.39 | 1.97 | 4.80 |
|  | IA 1 | 79.08 | 9.71 | 2.72 | 0.25 | 0.89 | 0.12 | 0.04 | 0.22 | 0.88 | 0.72 | 4.36 |
|  | IA 2 | 81.58 | 3.17 | 1.21 | 0.14 | 0.55 | 1.52 | 0.13 | 0.16 | 0.67 | 5.29 | 5.13 |
| S 0.1 | NE 1 | 76.05 | 6.85 | 2.61 | 0.93 | 0.92 | 1.56 | 0.03 | 0.28 | 1.50 | 0.95 | 7.25 |
|  | NE 2 | 79.23 | 5.52 | 2.62 | 0.79 | 1.34 | 1.81 | 0.03 | 0.26 | 1.27 | 0.79 | 5.35 |
|  | NE 3 | 79.62 | 4.52 | 2.06 | 0.65 | 0.94 | 2.24 | 0.03 | 0.32 | 1.81 | 2.34 | 4.52 |
|  | IA 1 | 79.98 | 6.08 | 1.73 | 0.54 | 1.29 | 2.33 | 0.03 | 0.43 | 1.73 | 1.13 | 5.14 |
|  | IA 2 | 76.99 | 3.61 | 1.23 | 0.45 | 0.77 | 3.65 | 0.05 | 0.22 | 0.95 | 5.40 | 6.16 |
| S 1 | NE 1 | 77.05 | 5.59 | 2.81 | 0.36 | 1.05 | 4.32 | 0.04 | 0.35 | 1.98 | 3.04 | 2.12 |
|  | NE 3 | 76.69 | 2.77 | 2.64 | 0.45 | 0.55 | 7.72 | 0.04 | 0.16 | 2.42 | 3.24 | 2.24 |
|  | IA 1 | 70.35 | 7.70 | 2.65 | 0.47 | 1.13 | 3.39 | 0.03 | 0.27 | 1.50 | 0.81 | 10.68 |
|  | IA 2 | 79.61 | 3.77 | 0.88 | 0.16 | 0.64 | 5.02 | 0.04 | 0.23 | 0.84 | 6.47 | 1.94 |
| S3 | NE 1 | 79.07 | 6.42 | 1.76 | 0.32 | 0.74 | 3.10 | 0.03 | 0.28 | 1.01 | 0.69 | 5.76 |
|  | NE 2 | 69.15 | 9.77 | 2.55 | 0.31 | 0.74 | 4.71 | 0.03 | 0.19 | 1.01 | 0.66 | 9.91 |
|  | NE 3 | 70.46 | 3.46 | 5.25 | 0.49 | 0.71 | 7.79 | 0.03 | 0.18 | 1.76 | 3.23 | 5.63 |
|  | IA 1 | 79.31 | 7.39 | 1.44 | 0.42 | 1.10 | 1.27 | 0.03 | 0.42 | 1.38 | 0.87 | 5.68 |
|  | IA 2 | 74.30 | 3.96 | 1.49 | 0.12 | 0.47 | 5.10 | 0.05 | 0.15 | 0.79 | 7.40 | 5.8 |
| H 0.1 | NE 1 | 78.45 | 8.64 | 2.12 | 0.52 | 1.45 | 0.24 | 0.06 | 0.31 | 1.32 | 1.80 | 4.21 |
|  | NE 2 | 77.25 | 5.35 | 3.83 | 0.94 | 1.33 | 0.27 | 0.13 | 0.25 | 1.80 | 1.57 | 6.17 |
|  | NE 3 | 77.34 | 8.74 | 2.57 | 0.59 | 1.40 | 0.18 | 0.07 | 0.31 | 2.20 | 1.48 | 4.03 |
|  | IA 1 | 76.56 | 7.63 | 3.66 | 0.67 | 0.89 | 0.89 | 0.09 | 0.25 | 1.74 | 0.85 | 5.53 |
| H 1 | NE 1 | 79.14 | 6.72 | 1.12 | 0.51 | 1.26 | 0.38 | 0.07 | 0.44 | 1.57 | 2.37 | 5.72 |
|  | NE 2 | 78.29 | 5.09 | 2.33 | 0.87 | 1.62 | 0.25 | 0.07 | 0.33 | 1.27 | 0.89 | 7.96 |
|  | NE 3 | 80.96 | 5.79 | 2.53 | 0.75 | 0.69 | 0.16 | 0.08 | 0.14 | 1.83 | 1.33 | 4.78 |
|  | IA 1 | 72.08 | 13.70 | 2.65 | 0.34 | 1.04 | 0.20 | 0.14 | 0.32 | 1.56 | 0.89 | 5.92 |
|  | IA 2 | 83.05 | 4.50 | 0.81 | 0.22 | 0.80 | 0.57 | 0.31 | 0.23 | 0.91 | 3.31 | 4.82 |
| H 3 | NE 1 | 84.11 | 5.72 | 0.91 | 0.29 | 0.95 | 0.26 | 0.05 | 0.40 | 1.27 | 1.62 | 3.89 |
|  | NE 2 | 72.73 | 13.32 | 2.45 | 0.33 | 1.03 | 0.15 | 0.08 | 0.25 | 1.38 | 1.69 | 5.64 |
|  | NE 3 | 64.13 | 18.92 | 2.62 | 0.57 | 0.79 | 0.50 | 0.12 | 0.20 | 2.51 | 1.84 | 6.53 |
|  | IA 1 | 51.94 | 30.10 | 2.65 | 0.24 | 0.46 | 0.36 | 0.22 | 0.14 | 1.09 | 0.75 | 10.13 |
|  | IA 2 | 79.79 | 8.36 | 0.81 | 0.13 | 0.69 | 0.70 | 0.38 | 0.26 | 0.92 | 3.04 | 4.36 |
| C 0.1 | NE 1 | 81.23 | 4.93 | 3.52 | 0.87 | 1.04 | 0.22 | 0.08 | 0.31 | 1.39 | 1.05 | 4.24 |
|  | NE 2 | 74.48 | 7.10 | 5.69 | 0.79 | 1.92 | 0.19 | 0.11 | 0.29 | 1.59 | 1.03 | 5.48 |
|  | NE 3 | 81.45 | 4.68 | 2.53 | 0.65 | 1.15 | 0.88 | 0.14 | 0.27 | 1.62 | 3.06 | 2.70 |
|  | IA 1 | 72.71 | 9.09 | 2.87 | 0.37 | 1.46 | 0.23 | 0.10 | 0.36 | 1.16 | 0.95 | 9.72 |
|  | IA 2 | 76.40 | 4.74 | 1.77 | 0.85 | 0.63 | 1.72 | 0.38 | 0.17 | 0.99 | 6.89 | 4.85 |
| C 1 | NE 1 | 80.56 | 9.24 | 2.74 | 1.01 | 1.45 | 0.38 | 0.05 | 0.43 | 1.90 | 1.11 | 0.07 |
|  | NE 2 | 74.80 | 8.52 | 5.07 | 1.13 | 1.50 | 0.33 | 0.16 | 0.29 | 1.77 | 1.01 | 3.87 |
|  | IA 1 | 79.28 | 6.20 | 2.23 | 0.48 | 1.00 | 0.16 | 0.06 | 0.29 | 0.98 | 1.66 | 6.80 |
|  | IA 2 | 74.87 | 2.94 | 0.89 | 0.81 | 0.59 | 2.95 | 0.48 | 0.17 | 2.14 | 6.39 | 7.31 |
| C3 | NE 1 | 75.92 | 7.93 | 1.68 | 0.85 | 0.87 | 0.69 | 0.04 | 0.26 | 0.96 | 1.05 | 8.97 |
|  | NE 2 | 78.80 | 6.09 | 3.34 | 0.89 | 1.54 | 0.29 | 0.05 | 0.29 | 1.62 | 1.07 | 4.98 |
|  | NE 3 | 78.64 | 4.35 | 2.29 | 0.85 | 0.94 | 1.24 | 0.05 | 0.24 | 1.52 | 3.14 | 5.92 |
|  | IA 1 | 79.28 | 4.85 | 2.79 | 0.65 | 0.72 | 0.18 | 0.07 | 0.23 | 1.08 | 1.91 | 7.14 |
|  | IA 2 | 82.00 | 3.28 | 1.40 | 0.50 | 0.68 | 2.32 | 0.09 | 0.20 | 0.77 | 6.49 | 1.87 |

Pretreating CSA with water, on average, increased the SiO$_2$ content by at least 13.53 mass %, from 57.65 mass % to 71.18 mass %. The average increase in SiO$_2$ for water pretreated NE1, NE2, IA1, IA2 were 14.04 mass %, 14.80 mass %, 15.73 mass % and 73.58 mass %, respectively. The increase in SiO$_2$ of pretreated CSA is due to the insolubility of SiO$_2$ and dilution of other phases. Acid pretreatment resulted in higher average SiO$_2$ content compared to water pretreated CSA. The average SiO$_2$ content for CSA pretreated with 0.1M HNO$_3$, H$_2$SO$_4$, HCl, and C$_6$H$_8$O$_7$ are 77.66 mass %, 77.77 mass %, 77.4 mass %, and 77.25 mass %, respectively. Increasing the concentration of the acids from 0.1M to 1M and 3M created mixed results on average SiO$_2$ content. For HNO$_3$ a slight increase was observed when solution molarities increased from 0.1 to 3. For C$_6$H$_8$O$_7$, all molarities resulted in almost the same average SiO$_2$ contents, and an increase in the concentration of acid did not lead to a considerable change. A higher concentration of H$_2$SO$_4$ reduced the average SiO$_2$. Raising the molarity of HCl solution from 0.1M to 1M resulted in a 1.30 mass % increase. However, raising the molarity to 3M caused an 8.16 mass % reduction in the average $SiO_2$. $HNO_3$ with a concentration of 3M had the highest $SiO_2$ content, which was 8.83 mass % higher that of water pretreated CSA and 22.36 mass % higher than untreated CSA. The use of more dilute acids to achieve higher $SiO_2$ rates may result in safer and more environmentally friendly processes.

The average $P_2O_5$ content dropped from 1.6 mass % in untreated CSA to 0.89 mass % in water pretreated CSA. For all acid pretreatments, except $C_6H_8O_7$, higher molarities led to lower average $P_2O_5$ content. For $HNO_3$ pretreated CSA, an increase in the concentration from 0.1M to 1M and then to 3M reduced the average $P_2O_5$ content from 0.69 mass % to 0.36 mass % to 0.31 mass %. Low concentration (0.1M) $HNO_3$, $H_2SO_4$, and $C_6H_8O_7$ resulted in almost the same average $P_2O_5$ content, ranging from 0.67 mass % to 0.71 mass %. 1M $HNO_3$ and $H_2SO_4$ resulted in average $P_2O_5$ content of 0.36 mass %. 1M HCl and $C_6H_8O_7$ led to higher average $P_2O_5$ contents of 0.54 mass % and 0.86 mass %. 3M $HNO_3$, $H_2SO_4$, and HCl resulted in average $P_2O_5$ content ranging from 0.31 mass % to 0.33 mass %. 3M $C_6H_8O_7$, however, had an average $P_2O_5$ content of 0.75 mass % due to the low solubility of $P_2O_5$ in $C_6H_8O_7$.

Chloride-induced corrosion influences the degradation of concrete. According to the American Concrete Institute standard ACI 318, the water soluble Cl content levels is limited to 0.15% by mass of concrete in reinforced concrete exposed to moisture and external sources of chlorides, 0.3% by mass concrete in reinforced concrete only exposed to moisture, and 0.06% by mass of concrete in pre-stressed structures. Untreated CSA had a chloride content of 0.467 mass %. Water pretreatment reduced the average Cl content to 0.112 mass %. $HNO_3$ pretreatment reduced the Cl content to an average of 0.056 mass %, 0.048 mass %, and 0.060 mass % for 0.1M, 1M, and 3M concentrations, respectively. $H_2SO_4$ pretreatment reduced the average Cl content to 0.034 mass %, 0.038 mass %, and 0.034 mass % for 0.1M, 1M, and 3M concentrations, respectively. HCl pretreatment reduced the average Cl content to 0.088 mass %, 0.134 mass %, and 0.170 mass % for 0.1M, 1M, and 3M, respectively. The HCl pretreatment resulted in relatively higher Cl content due to the presence of Cl in the acid solution. $C_6H_8O_7$ pretreatment led to high Cl content than the water pretreated samples. This is due to the reaction of $C_6H_8O_7$ with the $C_1$, which creates $CHCl_3$.

$SO_3$ content influences the short-term and long-term concrete properties including setting time, compressive strength, volume expansion, and durability. ASTM C150 limits $SO_3$, based on cement type, to from 2.3 mass % to 3.5 mass %. A $SO_3$ content greater than 3 mass % impacts the concrete durability when the concrete is exposed to a sulfate attack. ASTM C618-19 limits the $SO_3$ content to 5 mass % and 4 mass % for fly ash class F and class C, respectively. The average $SO_3$ content for untreated CSA was 0.35 mass %. Acid pretreatment with $H_2SO_4$ increased the average $SO_3$ content to 2.32 mass %, 5.11 mass %, and 4.39 mass % for 0.1M, 1M and 3M, respectively, due to the presence of $SO_3$ in the acid solution. 1M HCl pretreatment led to a reduction in the average $SO_3$ content to 0.31 mass %.

The total alkali content ($Na_2O+(0.658 \cdot K_2O)$) negatively impacts the concrete properties by accelerating hydration, promoting rapid setting, and reducing the compressive strength by forming weaker C—S—H structures in high alkaline conditions. Untreated CSAs had significant amounts of alkali oxides. The main portion of $K_2O$ is water-soluble. Water pretreatment, therefore, reduced the average $K_2O$ content in the untreated CSA (10.76 mass %)

to 3.6 mass %, more than a 66% reduction. Acid pretreatment reduced the average $K_2O$ content to less than 2.1 mass %. 0.1M $C_6H_8O_7$ and $HNO_3$ had the most significant reduction in average $K_2O$ content.

Figure 6:
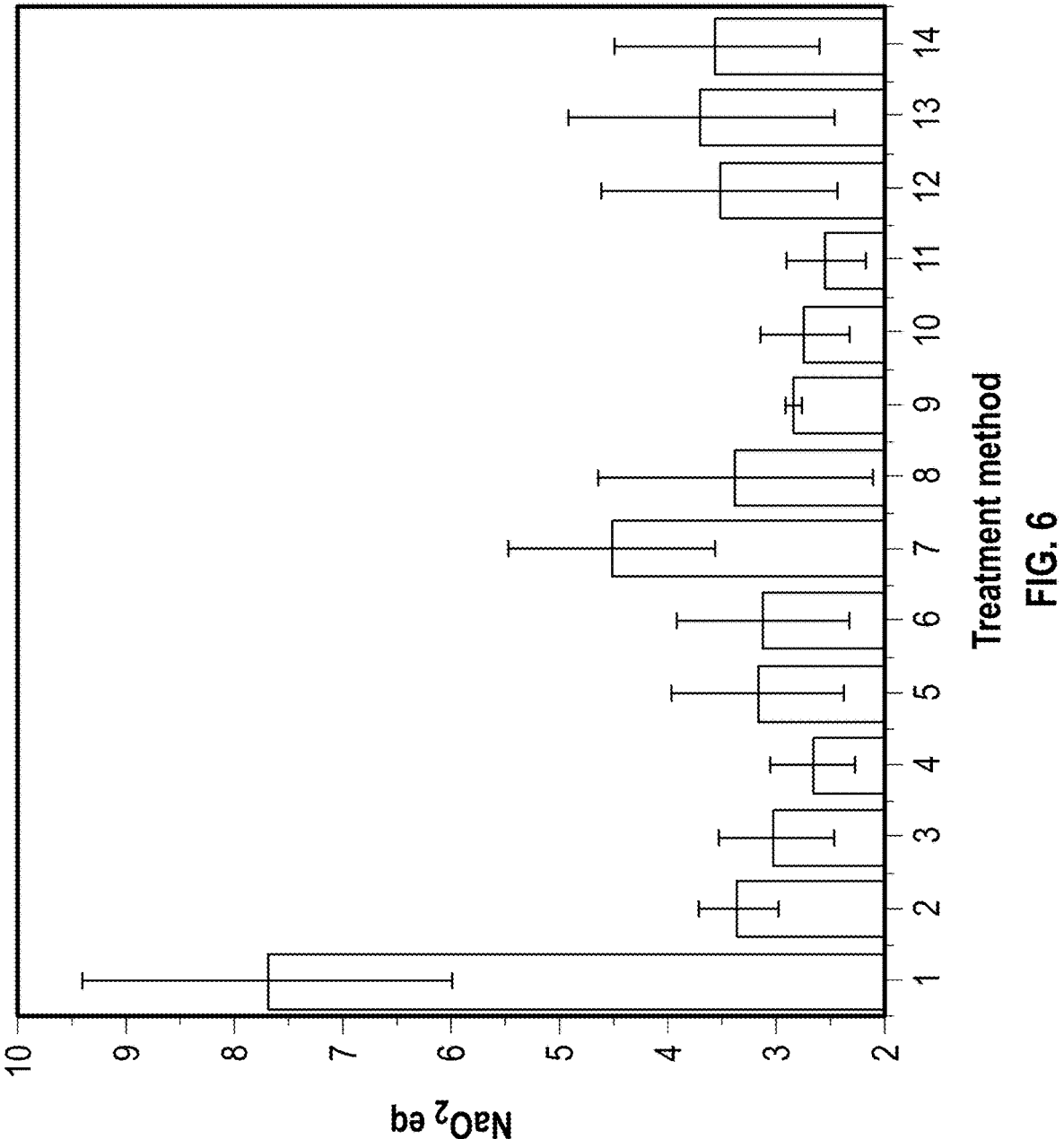
FIG. 6 illustrates the average $Na_2O$ contents of CSA samples, according to embodiments of the disclosure.

FIG. 6 shows the average $Na_2O$ contents of CSA samples. Each treatment method included 5 samples to be tested. Treatment method 1 refers to untreated CSA. Treatment method 2 refers to water-pretreated CSA. Treatment method 3 indicates 0.1M $HNO_3$. Treatment method 4 refers to 1M $HNO_3$. Treatment method 5 refers to 3M $HNO_3$. Treatment method 6 refers to 0.1M $H_2SO_4$. Treatment method 7 refers to 1M $H_2SO_4$. Treatment method 8 refers to 3M $H_2SO_4$. Treatment method 9 refers to 0.1M HCl. Treatment method 10 refers to 1M HCl. Treatment method 11 refers to 3M HCl. Treatment method 12 refers to 0.1M $C_6H_8O_7$. Treatment method 13 refers to 1M $C_6H_8O_7$. Treatment method 14 refers to 3M $C_6H_8O_7$.

Overall, the data indicated that untreated CSA had an average $Na_2O$ content of 7.70 mass %. Water pretreatment reduced the average $Na_2O$ content to 3.32 mass %. HCl and $HNO_3$ pretreated CSA resulted in lower average $Na_2O$ content that water pretreatment. The reduction in the $Na_2O$ content through water pretreatment and acid pretreatment can improve the properties of the concrete by decelerating hydration, inhibiting rapid setting, and increasing the compressive strength by forming stronger C—S—H structures in low alkaline conditions. Further the lack of $Na_2O$ can curtail the initiation of alkali-silica reactions.

Table 5 shows the $Na_2O$ content for fly ash (C and F classes), slag, silica fume and agricultural wastes. Fly ash (C and F classes) are common SCMs. Fly ash has a wide range of $Na_2O$ content. Compared to OPC, SCMs have a higher amount of alkali oxides. ASTM C150 limits the $Na_2O$ content to 0.6 mass % (by mass of cement) or less for OPC concrete. The maximum $Na_2O$ content is not defined in the industry for industrial and agricultural SCMs. The average $Na_2O$ content for fly ash, slag, and silica fume ranges from 0.56 mass % to 9 mass %, 0.3 mass % to 1.25 mass %, and 0.52 mass % to 1.25 mass %, respectively. The average $Na_2O$ contents for water pretreated, $HNO_3$ pretreated, and HCl pretreated CSA are 3.32 mass %, 2.63 mass % to 3.14 mass %, and 2.5 mass % to 2.8 mass %, respectively. The acid pretreated CSAs have comparable average $Na_2O$ contents to fly ash, which is currently the cheapest product available in the market. However, its supply is decreasing due to recent restrictions placed on coal-fired power plants. Thus, acid pretreated CSAs can wholly or partially replace fly ash as a SCM material without effecting the average $Na_2O$ content in the cementitious materials.

TABLE 5

| Na₂O content of common SCMs and pretreated AMAs (% mass) | | |
| --- | --- | --- |
| | $Na_2O_{eq}$ (%) | |
| SCM | min | max |
| Fly ash (C and F) | 0.56 | 9.41 |
| Silica fume | 0.30 | 1.25 |
| Slag | 0.52 | 2.09 |
| Treated CSA | 3.60 | 7.46 |
| Treated WSA | 1.11 | 3.02 |
| Treated RSA | 0.13 | 1.18 |
| Treated SCBA | — | 1.19 |

Figures 7A, 7B, 7C:
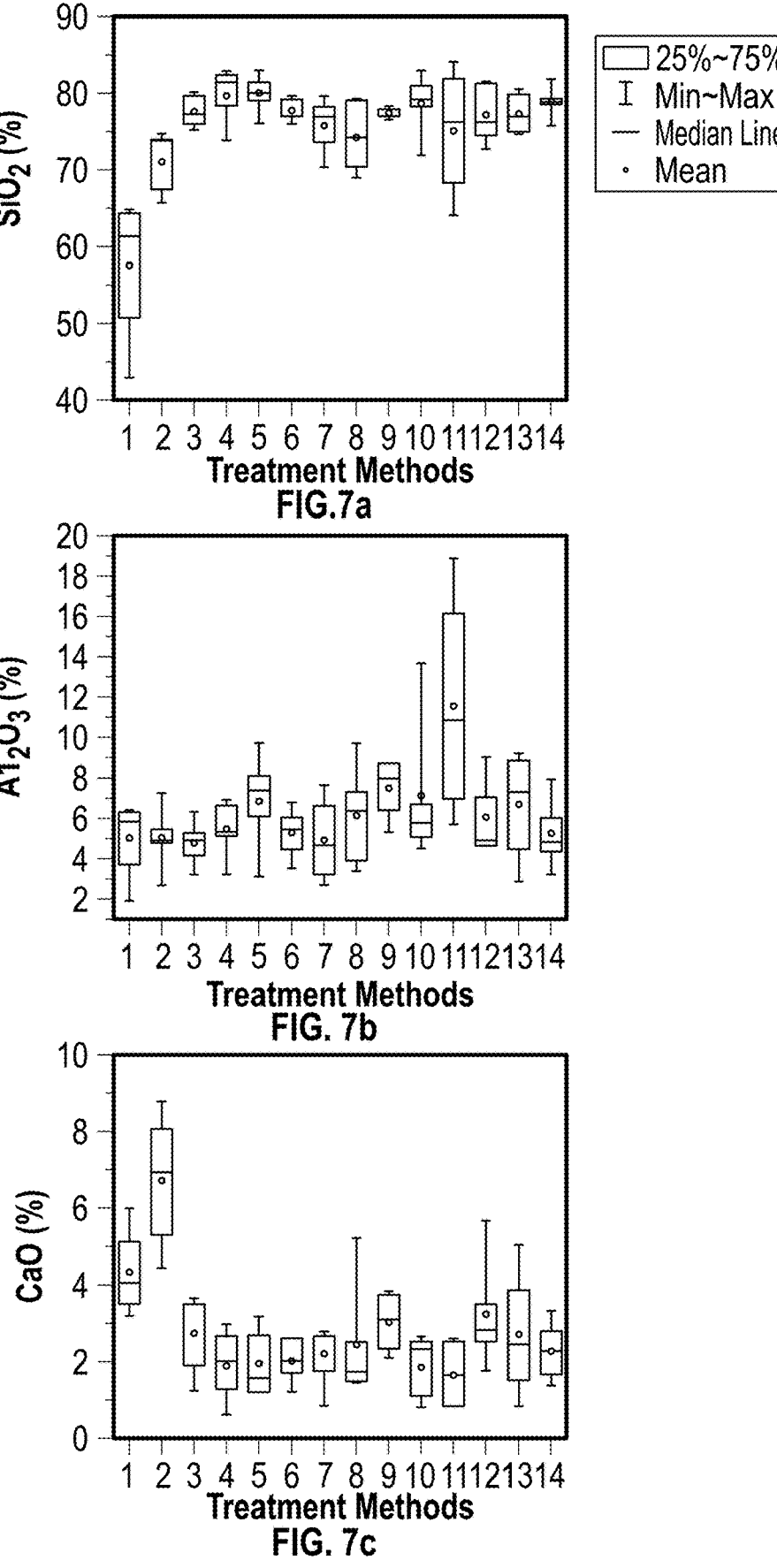
FIG. 7a illustrates the mass percentage of $SiO_2$ in untreated and pretreated CSAs, according to embodiments of the disclosure.
FIG. 7b illustrates the mass percentage of $Al_2O_3$ in untreated and pretreated CSAs.
FIG. 7c illustrates the mass percentage of CaO in untreated and pretreated CSAs, according to embodiments of the disclosure.
Figures 7D, 7E, 7F:
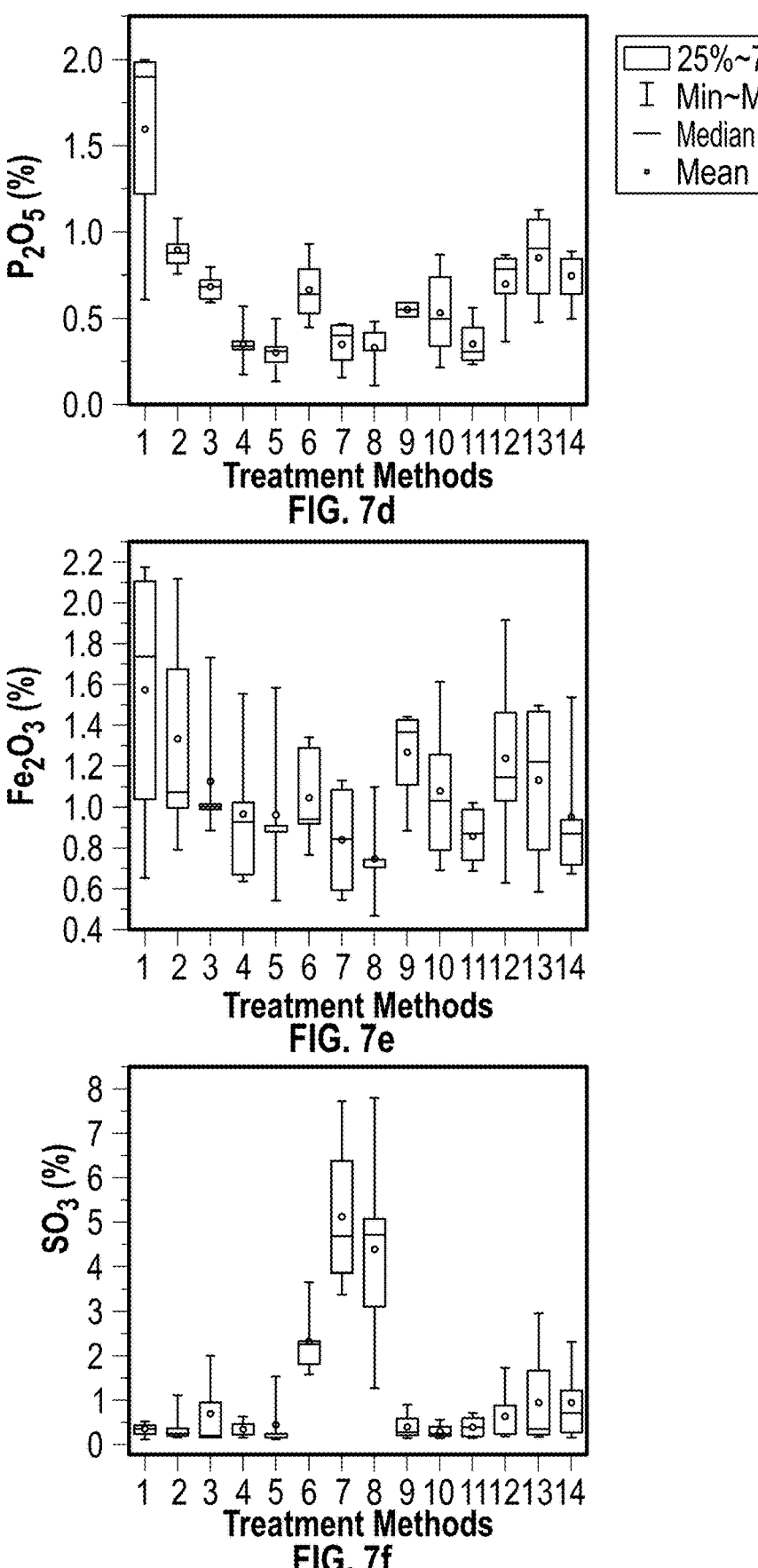
FIG. 7d illustrates the mass percentage of $P_2O_5$ in untreated and pretreated CSAs, according to embodiments of the disclosure.
FIG. 7e illustrates the mass percentage of $Fe_2O_3$ in untreated and pretreated CSAs, according to embodiments of the disclosure.
FIG. 7f illustrates the mass percentage of $SO_3$ in untreated and pretreated CSAs, according to embodiments of the disclosure.
Figures 7G, 7H, 7I:
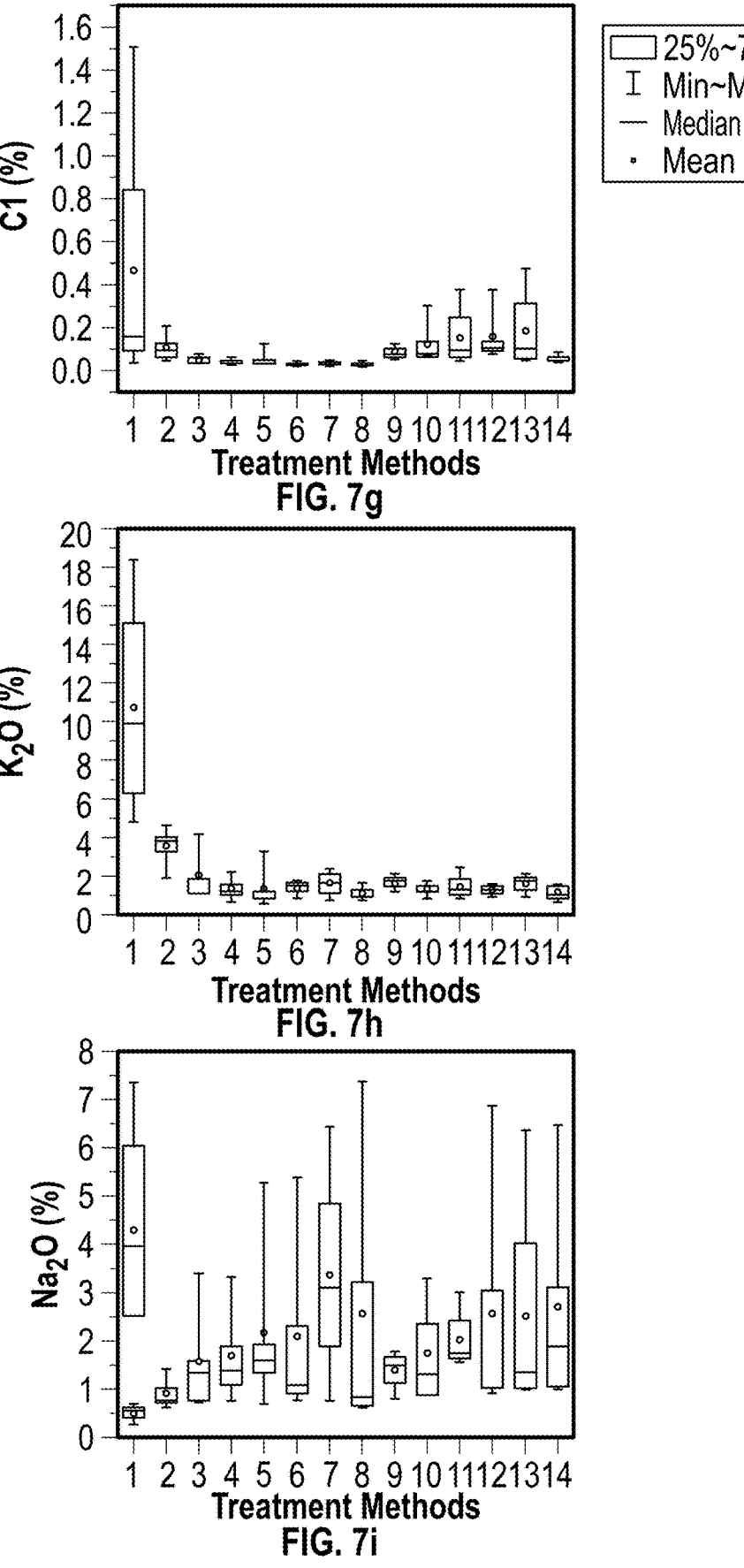
FIG. 7g illustrates the mass percentage of Cl in untreated and pretreated CSAs, according to embodiments of the disclosure.
FIG. 7h illustrates the mass percentage of $K_2O$ in untreated and pretreated CSAs, according to embodiments of the disclosure.
FIG. 7i illustrates the mass percentage of $Na_2O$ in untreated and pretreated CSAs, according to embodiments of the disclosure.

FIGS. 7a-7i show the variability in mass percentage of different materials in untreated and pretreated CSAs by mass percentage. FIG. 7a shows the mass percentage of $SiO_2$ in untreated and pretreated CSAs. FIG. 7*b* shows the mass percentage of $Al_2O_3$ in untreated and pretreated CSAs. FIG. 7*c* shows the mass percentage of CaO in untreated and pretreated CSAs. FIG. 7*d* shows the mass percentage of $P_2O_5$ in untreated and pretreated CSAs. FIG. 7*e* shows the mass percentage of $Fe_2O_3$ in untreated and pretreated CSAs. FIG. 7*f* shows the mass percentage of $SO_3$ in untreated and pretreated CSAs. FIG. 7*g* shows the mass percentage of Cl in untreated and pretreated CSAs. FIG. 7*h* shows the mass percentage of $K_2O$ in untreated and pretreated CSAs. FIG. 7*i* shows the mass percentage of $Na_2O$ in untreated and pretreated CSAs.

Treatment method 1 refers to untreated CSA. Treatment method 2 refers to water pretreated CSA. Treatment method 3 refers to 0.1M $HNO_3$. Treatment method 4 refers to 1M $HNO_3$. Treatment method 5 refers to 3M $HNO_3$. Treatment method 6 refers to 0.1M $H_2SO_4$. Treatment method 7 refers to 1M $H_2SO_4$. Treatment method 8 refers to 3M $H_2SO_4$. Treatment method 9 refers to 0.1M HCl. Treatment method 10 refers to 1M HCl. Treatment method 11 refers to 3M HCl. Treatment method 12 refers to 0.1M $C_6H_8O_7$. Treatment method 13 refers to 1M $C_6H_8O_7$. Treatment method 14 refers to 3M $C_6H_8O_7$.

FIG. 7*a* shows that the mass percentage of $SiO_2$ in pretreated CSA samples was greater than about 70 mass %, such as about greater than 80 mass %, such as about greater than 85 mass %. FIG. 7*b* shows that the mass percentage of $Al_2O_3$ in pretreated CSA samples was less than about 10 mass % for all samples except Treatment 11, such as less than about 8%. FIG. 7*c* shows the mass percentage of CaO was less than about 4 mass % for all samples except Treatment 1 and Treatment 2 samples. FIG. 7*d* shows that the mass percentage of $P_2O_5$ in the CSA samples was less than about 1 mass % for all samples except the untreated sample (Treatment 1). FIG. 7*e* shows that the mass percentage of $Fe_2O_3$ in all CSA samples is less than about 2 mass %. FIG. 7*f* shows that the mass percentage of $SO_3$ in the CSA samples is less than 2 mass %, except for Treatments 6, 7, and 8. FIG. 7*g* shows that the mass percentage of chlorine is less than about 0.3 mass % for all samples except the untreated sample (Treatment 1). FIG. 7*h* shows the mass percentage of $K_2O$ is less than about 4% for the CSA samples, except for the untreated sample (Treatment 1). FIG. 7*i* shows the mass percentage of $Na_2O$ is less than about 5% for the CSA samples.

All acid pretreatments reduced the median and variability in the CaO content of the CSAs. Both water pretreated and acid pretreated CSAs reduced the variability and median contents of $P_2O_5$, Cl, and $K_2O$, which can influence fresh properties, mechanical performance, and durability aspects of concrete. All acid pretreated CSAs resulted in higher $SiO_2$ content compared to water pretreated CSA. 0.1M HCl resulted in the lowest $SiO_2$ content variability. All of these factors indicate that acid pretreatment leads to significant material property improvements in the AWASCMs, and thus in the resultant cement and concrete.

Figure 8:
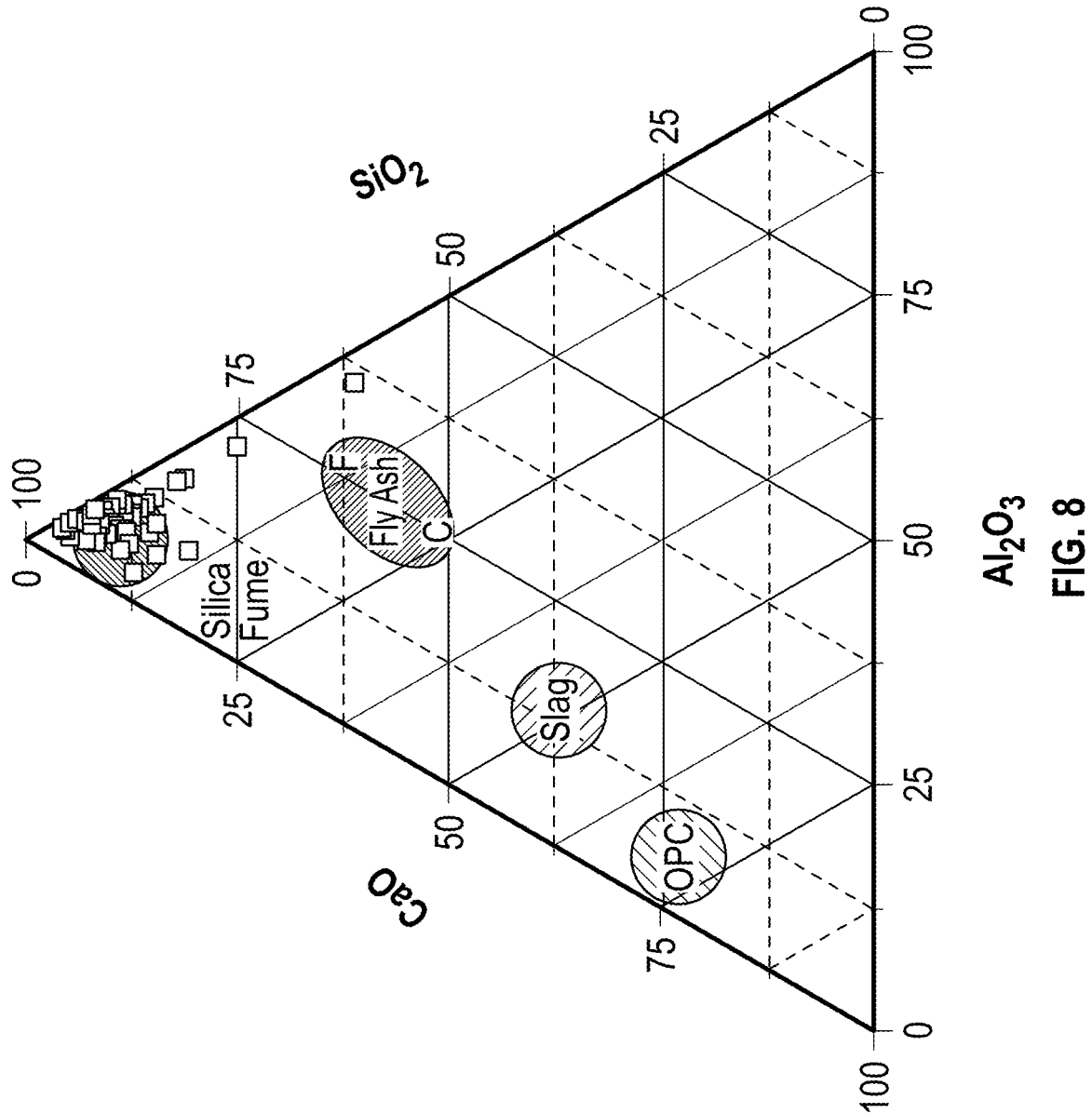
FIG. 8 illustrates a ternary diagram of normalized chemical composition, according to embodiments of the disclosure.

FIG. 8 shows a ternary diagram of normalized chemical composition, including CaO, $Al_2O_3$, and $SiO_2$. The sum of CaO, $Al_2O_3$, and $SiO_2$ contents are normalized to equal 100%. The dots represent the results for a pretreatment method. The compositional range of fly ash (class C and F), slag, silica fume and OPC cement are superimposed. Pretreated CSA falls near the tip of the ternary diagram and, in term of composition, is very similar to silica fume, which has a considerable amount of $SiO_2$, and a lower amount of CaO compared to OPC, fly ash, and slag. Per ASTM C618-19, the standard specification for fly ash, the chemical requirements for fly ash classes F and C are a maximum content of $SO_3$ equals 5 mass % and a minimum content of 50 mass % of three oxides according to Equation (1).

$$SiO_2+Al_2O_3+Fe_2O_3>50\% \quad (1)$$

Table 6 provides a comparison between CSA and fly ash, according to ASTM C618-19 and EN 450, the European chemical and physical requirements for fly ash. Pretreated CSA meets the chemical requirements set forth in both standards. Thus, FIG. 8 and Table 6 indicate that conventional SCM, fly ash in particular, can be either wholly or partially replaced with AWASCMs without significant deleterious effects on the properties required by the standard of SCMs for use in cement and concrete.

TABLE 6

Comparison between the CSA results and chemical requirements as per ASTM and EN standards (wt %)

| Standards | Chemical requirements | Criteria | N 0.1 | S 0.1 | H 0.1 | C 0.1 |
|---|---|---|---|---|---|---|
| ASTMC618-19 | [SiO2 + Al2O3 + Fe2O3] | >50% | 83.61 | 84.14 | 86.23 | 84.60 |
| | SO3 | <5% | 0.70 | 2.32 | 0.40 | 0.65 |
| | CaO | >18% type F | 2.77 | 2.05 | 3.05 | 3.28 |
| | | >18% type F | | | | |
| EN 450-1, EN 196-2 EN 451-1 | [SiO2 + Al2O3 + Fe2O3] | ≥70% | 83.61 | 84.14 | 86.23 | 84.60 |
| | Cl | ≤0.1% | 0.06 | 0.03 | 0.07 | 0.16 |
| | SO3 | ≤0.3% | 0.70 | 2.32 | 0.40 | 0.65 |
| | Na2Oeq | ≤0.5% | 2.98 | 3.08 | 2.80 | 3.48 |
| | P2O5 | ≤0.5% | 0.69 | 0.67 | 0.68 | 0.71 |

Figures 9A, 9B, 9C, 9D:
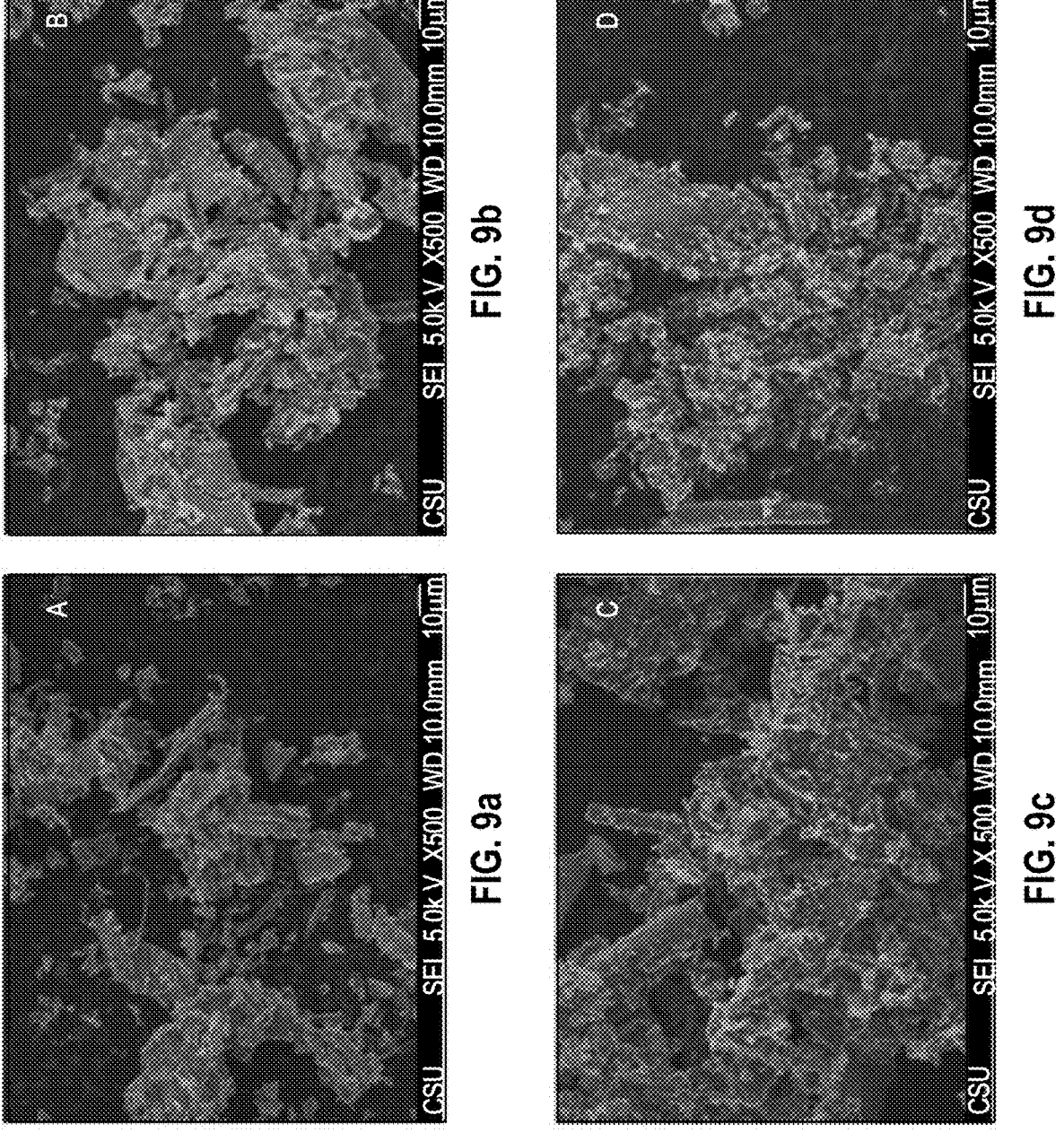
FIG. 9a illustrates the scanning electron microscopy (SEM) image for 0.1M $HNO_3$ pretreated CSA, according to embodiments of the disclosure.
FIG. 9b illustrates the SEM image for 0.1M HCl pretreated CSA, according to embodiments of the disclosure.
FIG. 9c illustrates the SEM image for 0.1M $H_2SO_4$ pretreated CSA, according to embodiments of the disclosure.
FIG. 9d illustrates the SEM image for 0.1M $C_6H_8O_7$ pretreated CSA, according to embodiments of the disclosure.

FIGS. 9*a*-9*d* show the SEM images for acid pretreated CSA at 0.1M. Specifically, FIG. 9*a* shows the SEM image for 0.1M $HNO_3$ pretreated CSA and FIG. 9*b* shows the SEM image for 0.1M HCl pretreated CSA. FIG. 9*c* shows the SEM image for 0.1M $H_2SO_4$ pretreated CSA and FIG. 9*d* shows the SEM image for 0.1M $C_6H_8O_7$ pretreated CSA.

The surface and shape morphology show that acid pretreated CSA has irregular and angular-shaped particles and different particle sizes. Particle size and angularity impact fresh concrete properties, such as water demand, workability, and concrete microstructure. Due to the angularity of acid pretreated CSA particles, the inclusion of CSA in concrete mix proportions is expected to increase the total water demand of the mixture. Overall the data shown in FIG. 9*a*-9*d* indicate that while AWASCMs can either wholly or partially replace conventional SCMs, a change in the formulation of the cement with regard to the ratio of water to cement or superplasticizer may be needed to maintain the workability of concrete.

FIGS. 10a-10f show the phase assemblage of hydration products for systems containing OPC and 0.1M $HNO_3$ pretreated CSA with replacement levels of 5 mass % to 40 mass %. Phase assemblage of hydration products was determined by using the CemGEMS thermodynamic models application.

Figure 10A:
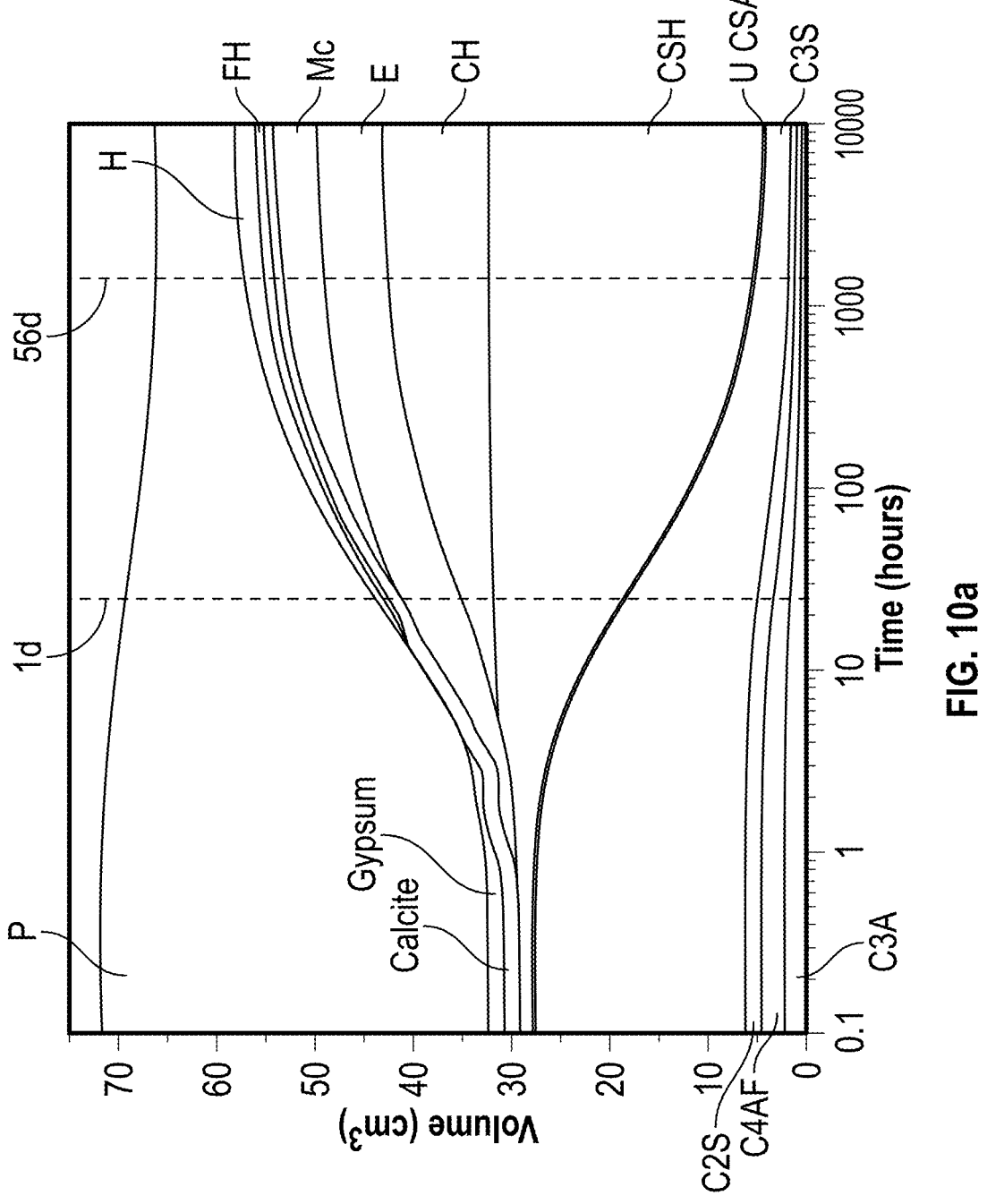
FIG. 10a illustrates the phase assemblage of the predicted hydration products for systems containing ordinary Portland cement (OPC) and 0.1M nitric acid ($HNO_3$) pretreated CSA with replacement levels of about 5 mass %, according to embodiments of the disclosure.
Figure 10B:
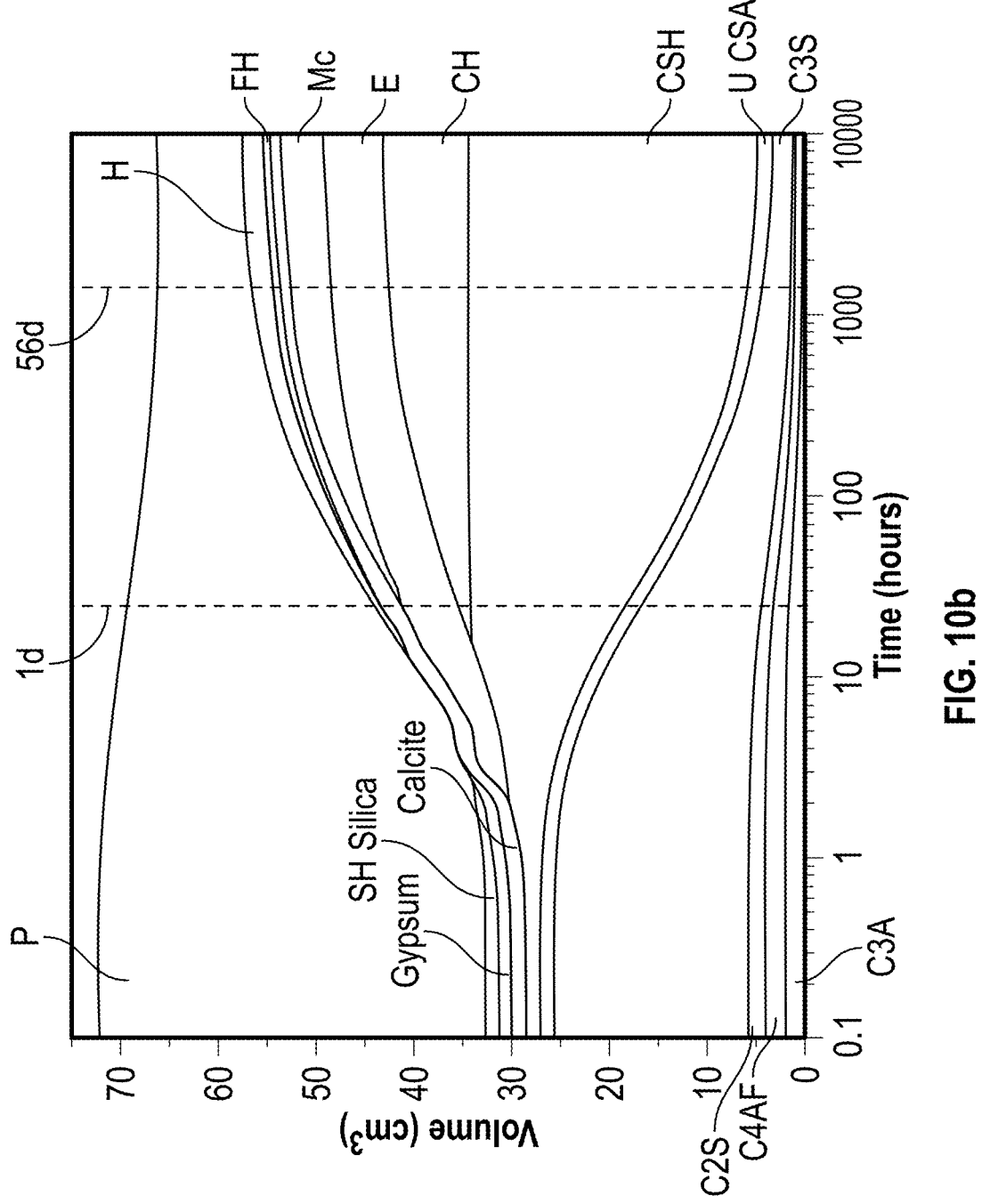
FIG. 10b illustrates the phase assemblage of the predicted hydration products for systems containing OPC and 0.1M $HNO_3$ pretreated CSA with replacement levels of about 10 mass %, according to embodiments of the disclosure.
Figure 10C:
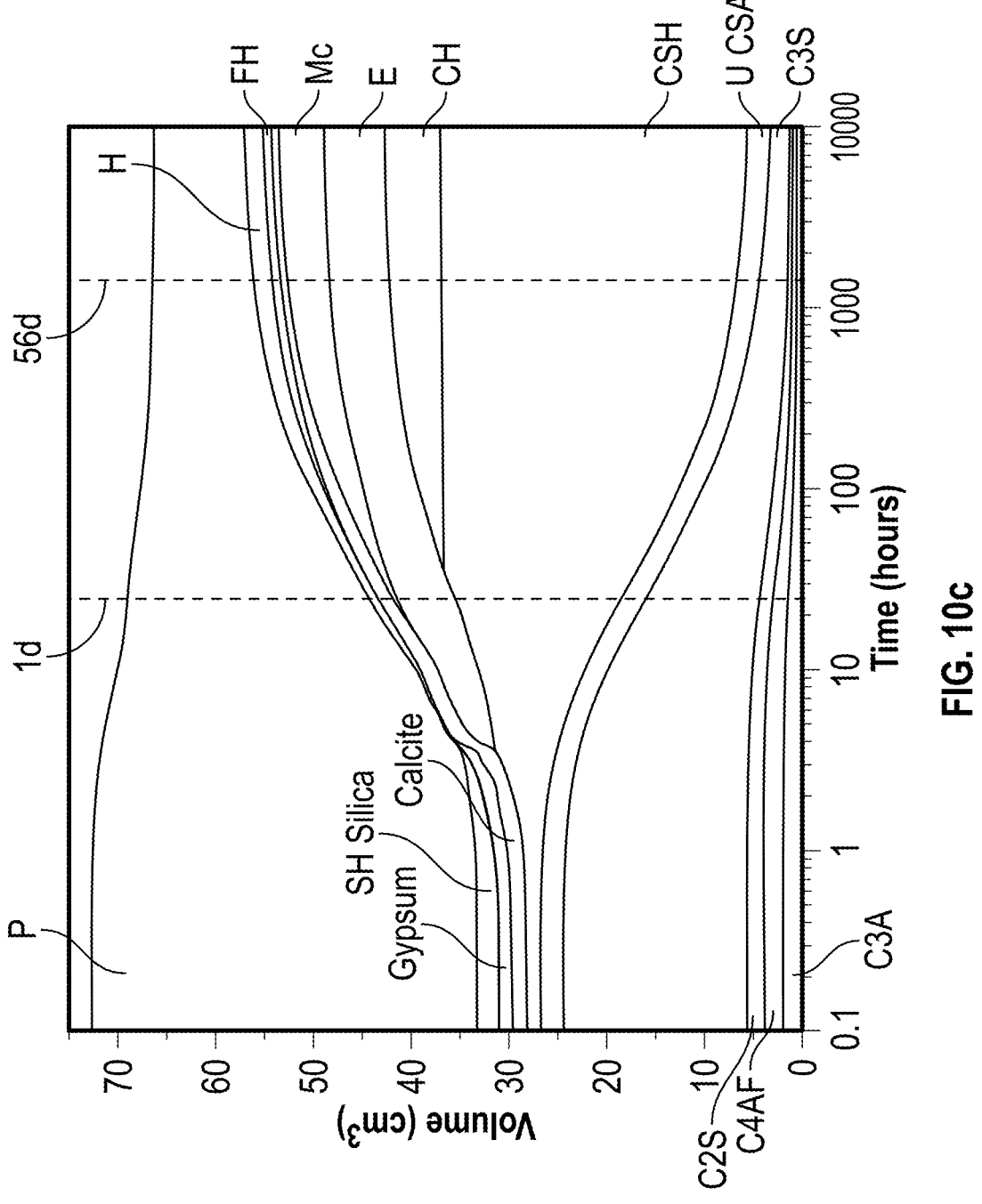
FIG. 10c illustrates the phase assemblage of the predicted hydration products for systems containing OPC and 0.1M $HNO_3$ pretreated CSA with replacement levels of about 15 mass %, according to embodiments of the disclosure.
Figure 10D:
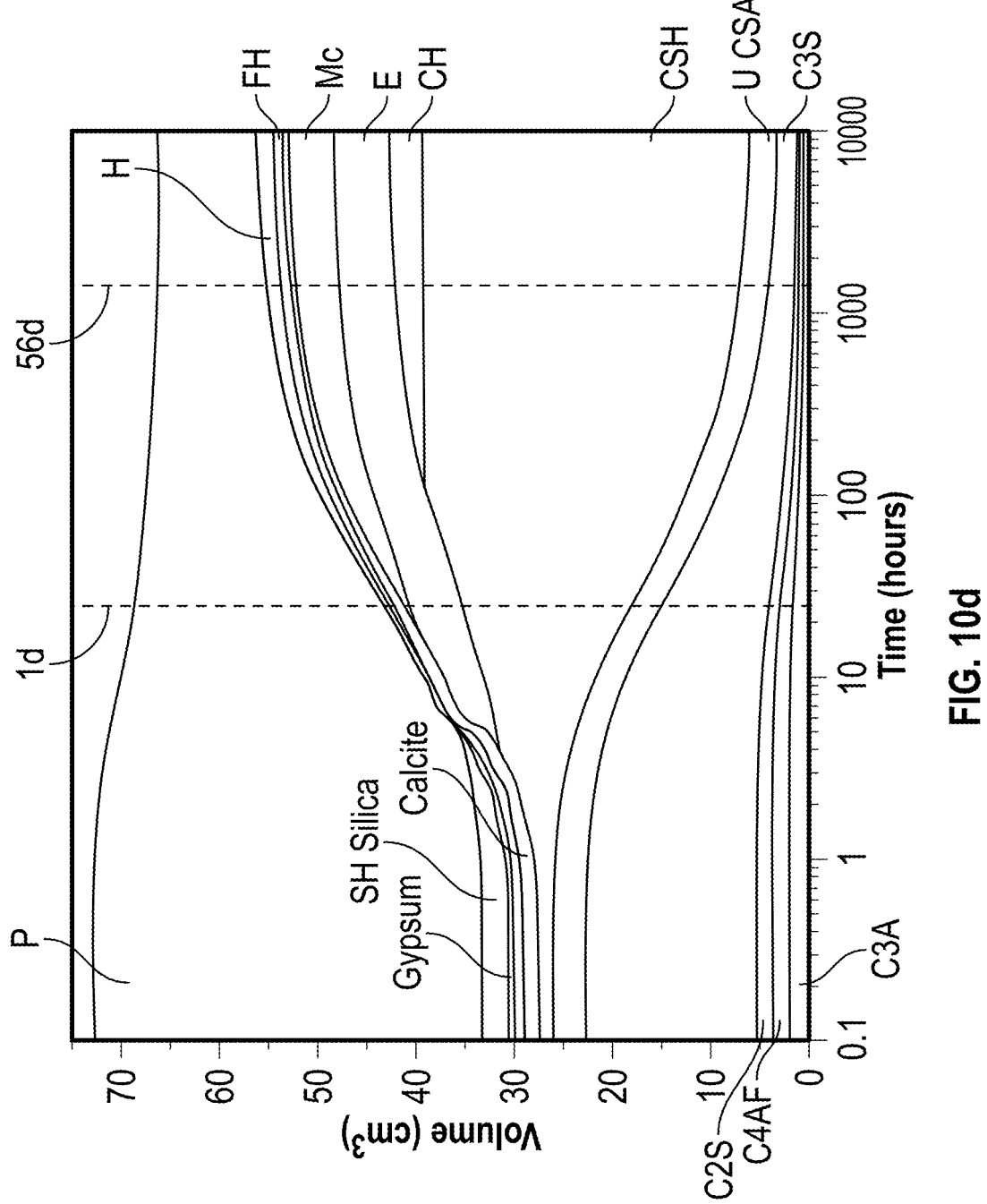
FIG. 10d illustrates the phase assemblage of the predicted hydration products for systems containing OPC and 0.1M $HNO_3$ pretreated CSA with replacement levels of about 20 mass %, according to embodiments of the disclosure.
Figure 10E:
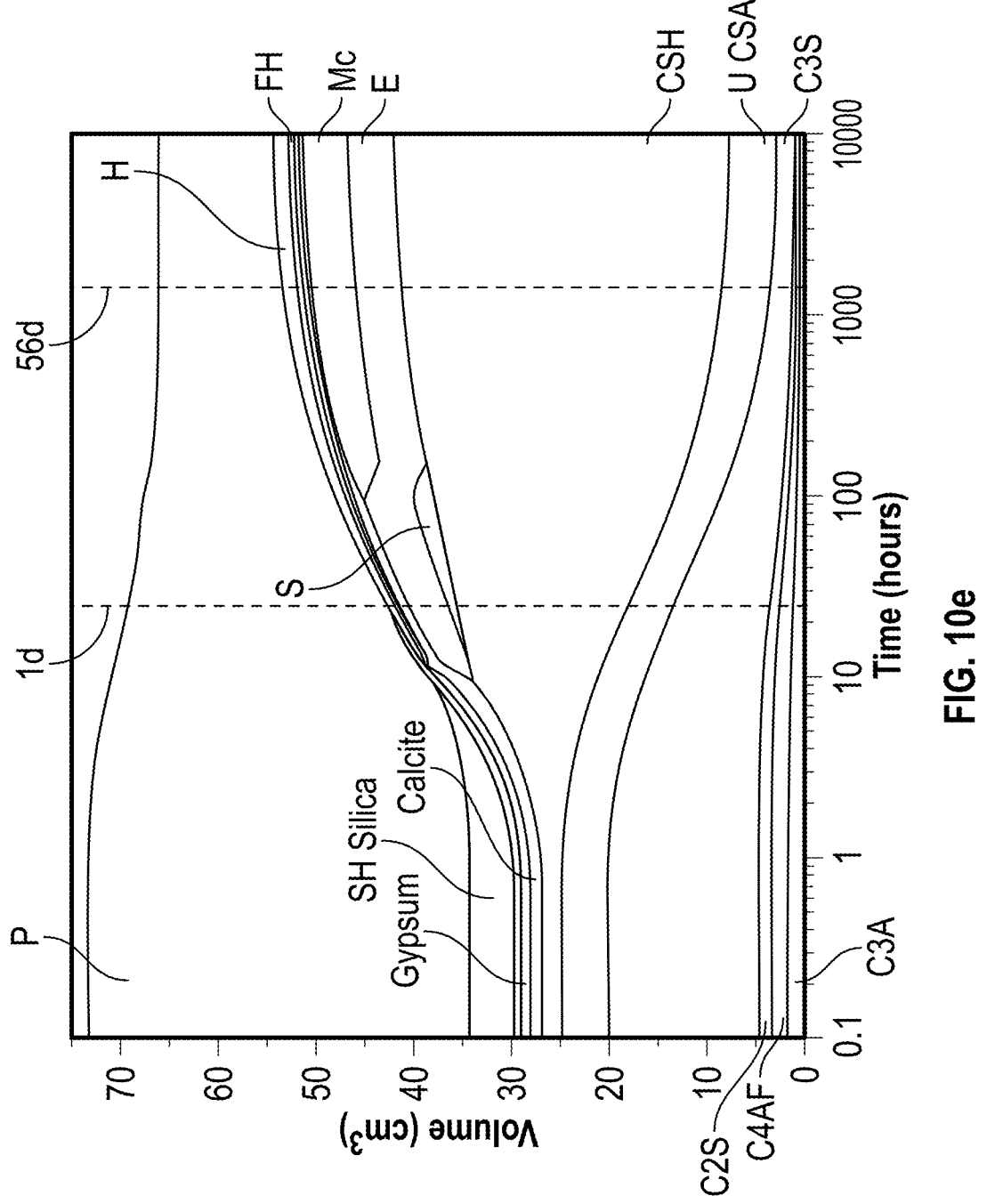
FIG. 10e illustrates the phase assemblage of the predicted hydration products for systems containing OPC and 0.1M $HNO_3$ pretreated CSA with replacement levels of about 30 mass %, according to embodiments of the disclosure.
Figure 10F:
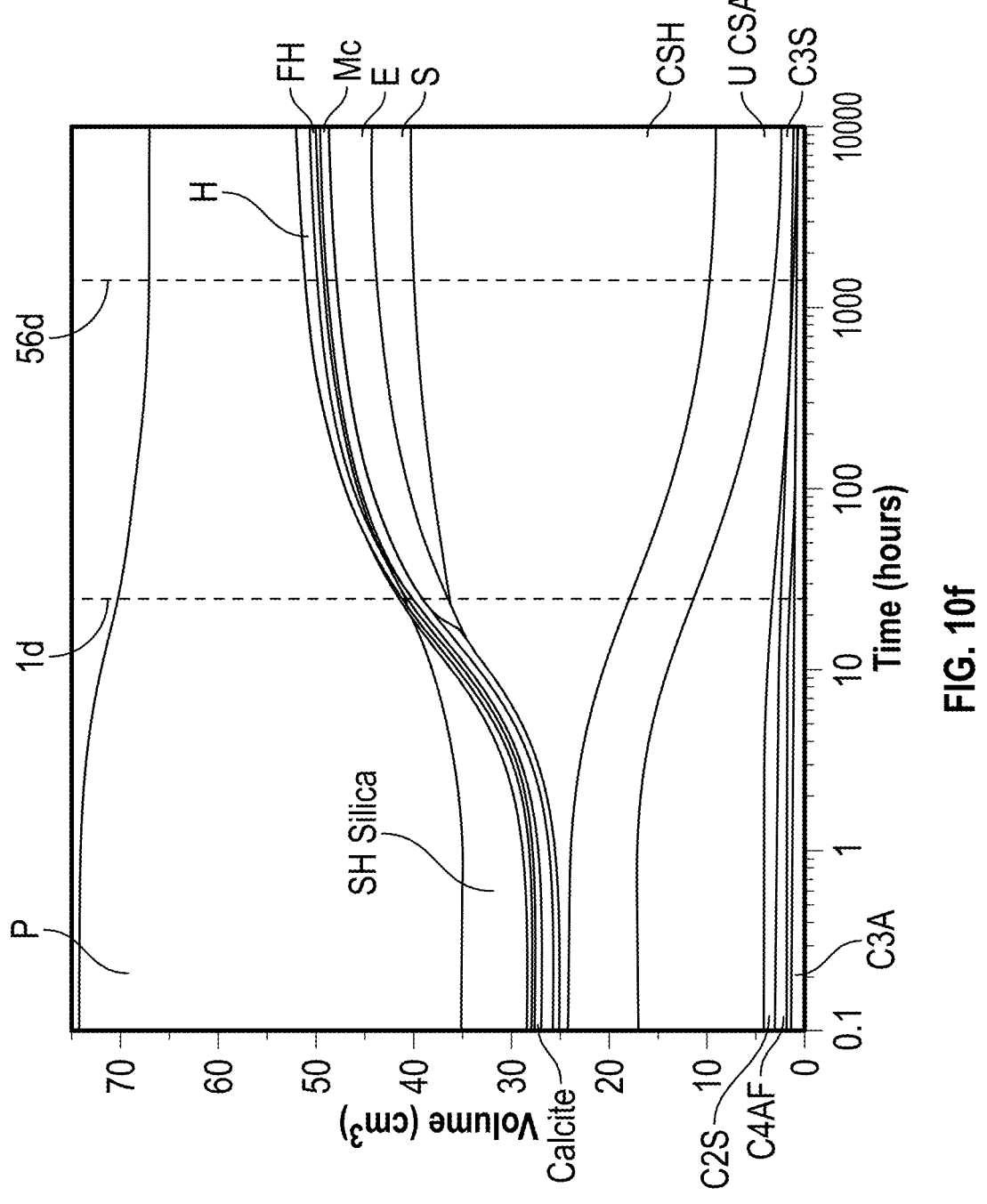
FIG. 10f illustrates the phase assemblage of the predicted hydration products for systems containing OPC and 0.1M $HNO_3$ pretreated CSA with replacement levels of about 40 mass %, according to embodiments of the disclosure.

FIG. 10a shows the phase assemblage of hydration products for systems with a 5 mass % replacement level. FIG. 10b shows the phase assemblage of hydration products for systems with a 10 mass % replacement level. FIG. 10c shows the phase assemblage of hydration products for systems with a 15 mass % replacement level. FIG. 10d shows the phase assemblage of hydration products for systems with a 20 mass % replacement level. FIG. 10e shows the phase assemblage of hydration products for systems with a 30 mass % replacement level. FIG. 10f shows the phase assemblage of hydration products for systems with a 40 mass % replacement level. P represents pore solution, H represents hydrotalcite, FH represents ferrihydrate, Mc represents monocarbonate, E represents ettringite, CH represents calcium hydroxide, CSH represents calcium silicate hydrate, U CSA represents unreacted CSA, tricalcium silicate ($Ca_3S$) represents alite, dicalcium silicate ($Ca_2S$) represents belite, $C_4AF$ represents calcium aluminoferrite, $C_3A$ represents calcium aluminate.

With an increase in CSA replacement level, the volume of unreacted CSA and SH-Silica considerably grows in the first hours of hydration. SH-Silica is the amorphous hydrous silica gel phase composed of $SiO2$ without $H_2O$ and is more soluble than quartz. SH-Silica forms during the pozzolanic reaction when too much reactive $SiO_2$-rich CSA has been added to the OPC. A comparison of FIGS. 10a, 10d, and 10f shows that in the first hours, $C_3S$ forms nearly 29%, 24%, and 18% of the total volume in mixes containing 5 mass %, 20 mass %, and 40 mass % $HNO_3$ pretreated CSA, respectively. The hydration products also change with the inclusion of more CSA in the mix design. Calcium hydroxide, which makes up 16% of the volume of the system after 56 days at a 5 mass % replacement level, reduced to 12%, 8%, 4% and 0% at replacement levels of 10 mass %, 15 mass %, 20 mass %, and 30 mass %. The incorporation of CSA leads to a higher C—S—H content by volume. For example, at 56 days the 5 mass % replacement contains 40% C—S—H by volume and the 30 mass % replacement contains 49% C—S—H by volume. Inclusion of CSA beyond 30% replacement levels leads to a reduction in the C—S—H content of the system due to a depletion of calcium hydroxide. The formation of stratlingite, an AFm phase with formula $Ca_2Al(AlSiO_7)$, occurs in binders containing $Al_2O_3$-rich SCMs. In the system with a 30 mass % replacement level, stratlingite forms and is consumed after 6.5 days and reacts with calcium hydroxide for form hydrogarnet. This also occurs with a 20 mass % replacement level, where a minor amount of stratlingite is formed at 11 hours and consumed at 28 hours. Stratlingite is a stable hydration product that is commonly found in the hydration of alumina-rich cement, and its formation inhibits the formation of $C_2AH_8$, reducing the risk of strength loss at later ages. At a 40 mass % replacement level, shown in FIG. 10f, unreacted CSA makes up 10 mass % of the volume. At this replacement level, the volume of SH-Silica is higher than other replacement percentages in the first hydration hours. The formation of stratlingite starts after 36 hours and constitutes 5.3% of the total volume after 28 days. The main solid phases in FIG. 10f after 56 days are C—S—H, unreacted CSA, ettringite, and stratlingite, respectively, at 46.2%, 10%, 8.2% and 5.7% of the total volume.

Figure 11A:
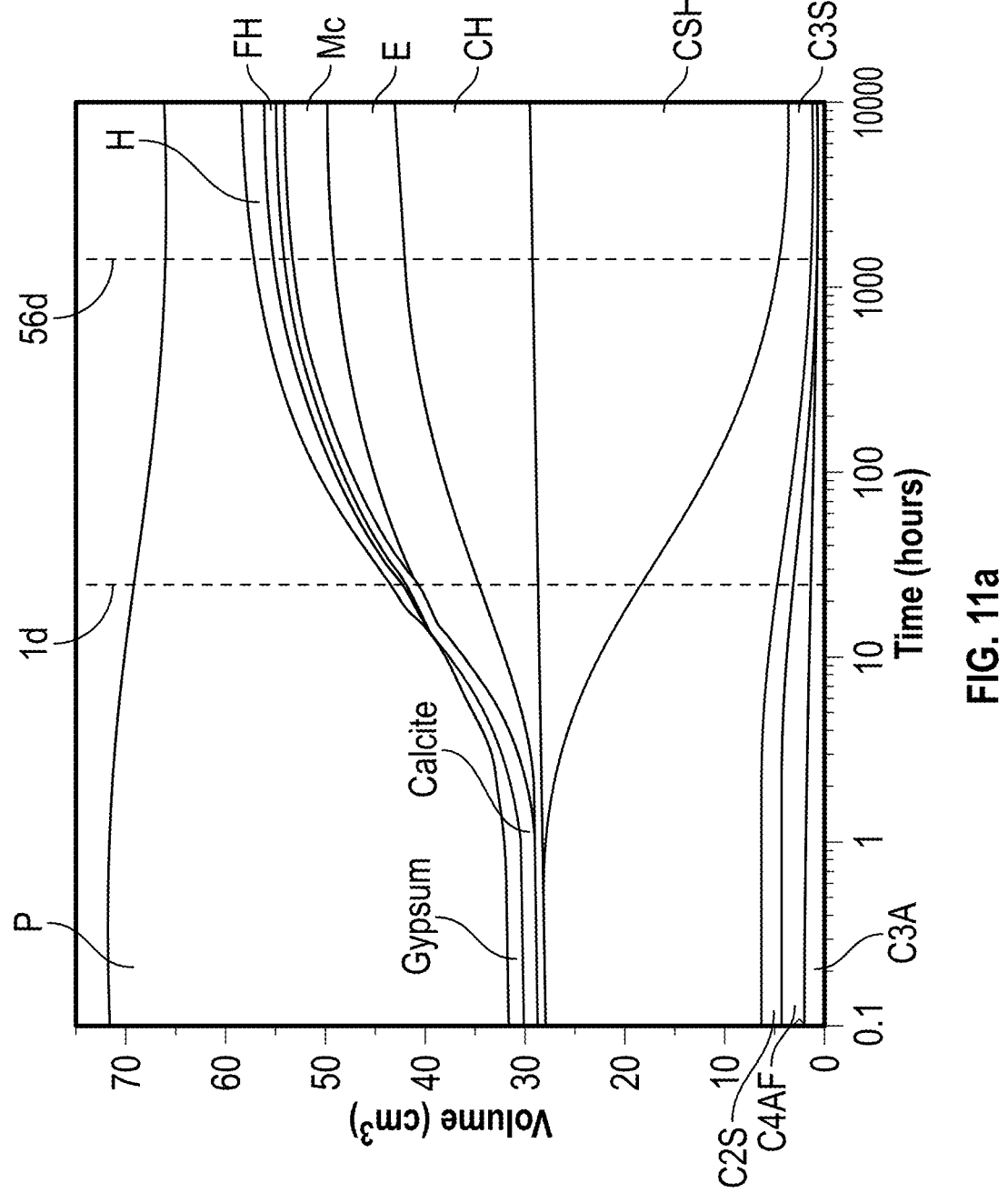
FIG. 11 a illustrates the phase assemblage of the predicted hydration products based on thermodynamic modes of OPC, according to embodiments of the disclosure.
FIG. 11b illustrates the phase assemblage of the predicted hydration products of untreated CSA at a replacement level of 20 mass %.
FIG. 11c shows the predicted hydration products of water pretreated CSA at a replacement level of 20 mass %.
FIG. 11d illustrates the phase assemblage of the predicted hydration products of 0.1 M $H_2SO_4$ acid pretreated CSA at a replacement level of 20 mass %.
FIG. 11e illustrates the phase assemblage of the predicted hydration products of 0.1 M HCl acid pretreated CSA at a replacement level of 20 mass %.
FIG. 11f illustrates the phase assemblage of the predicted hydration products of 0.1 M $C_6H_8O_7$ acid pretreated CSA at a replacement level of 20 mass %.
Figure 11B:
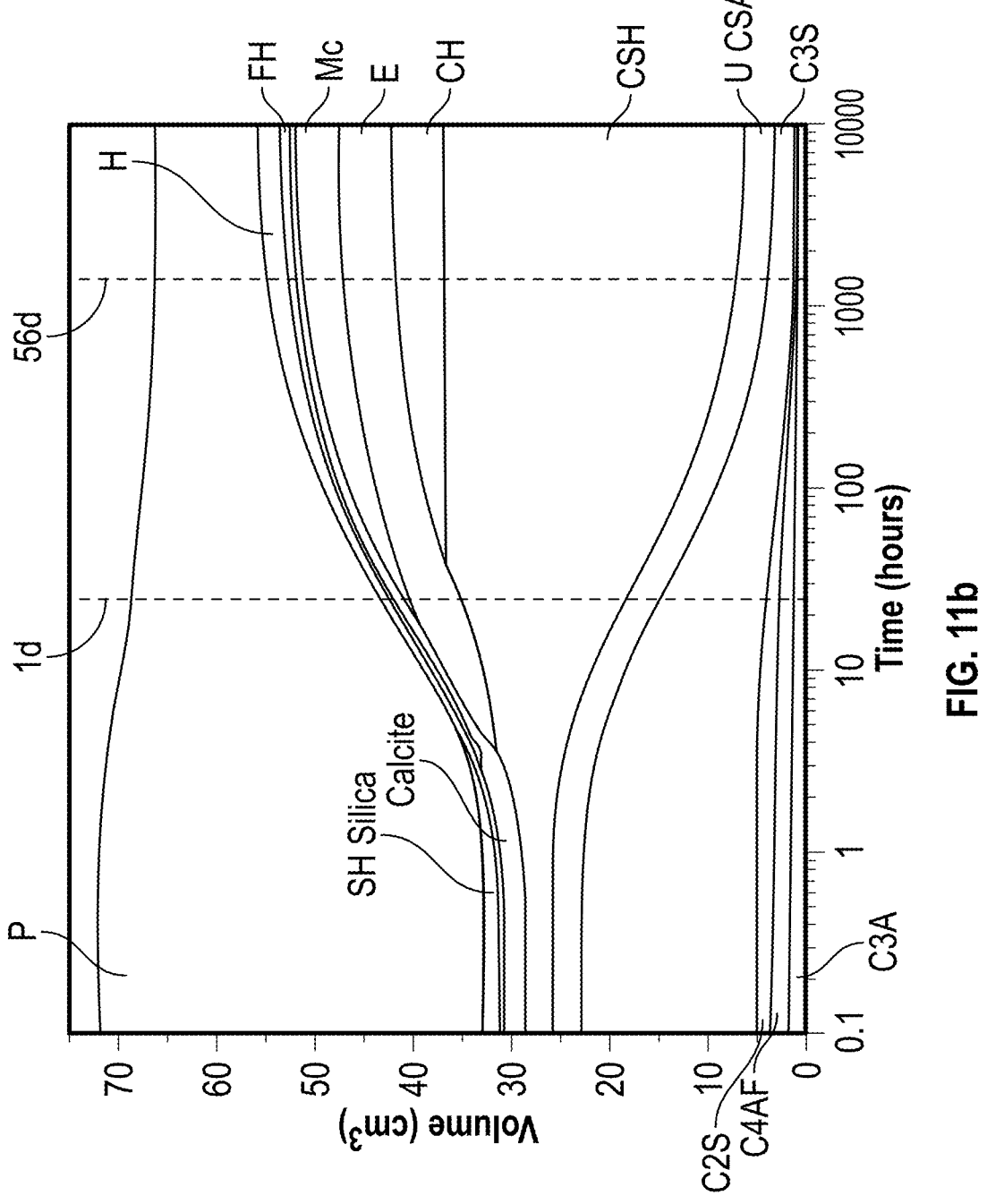
Figure 11C:
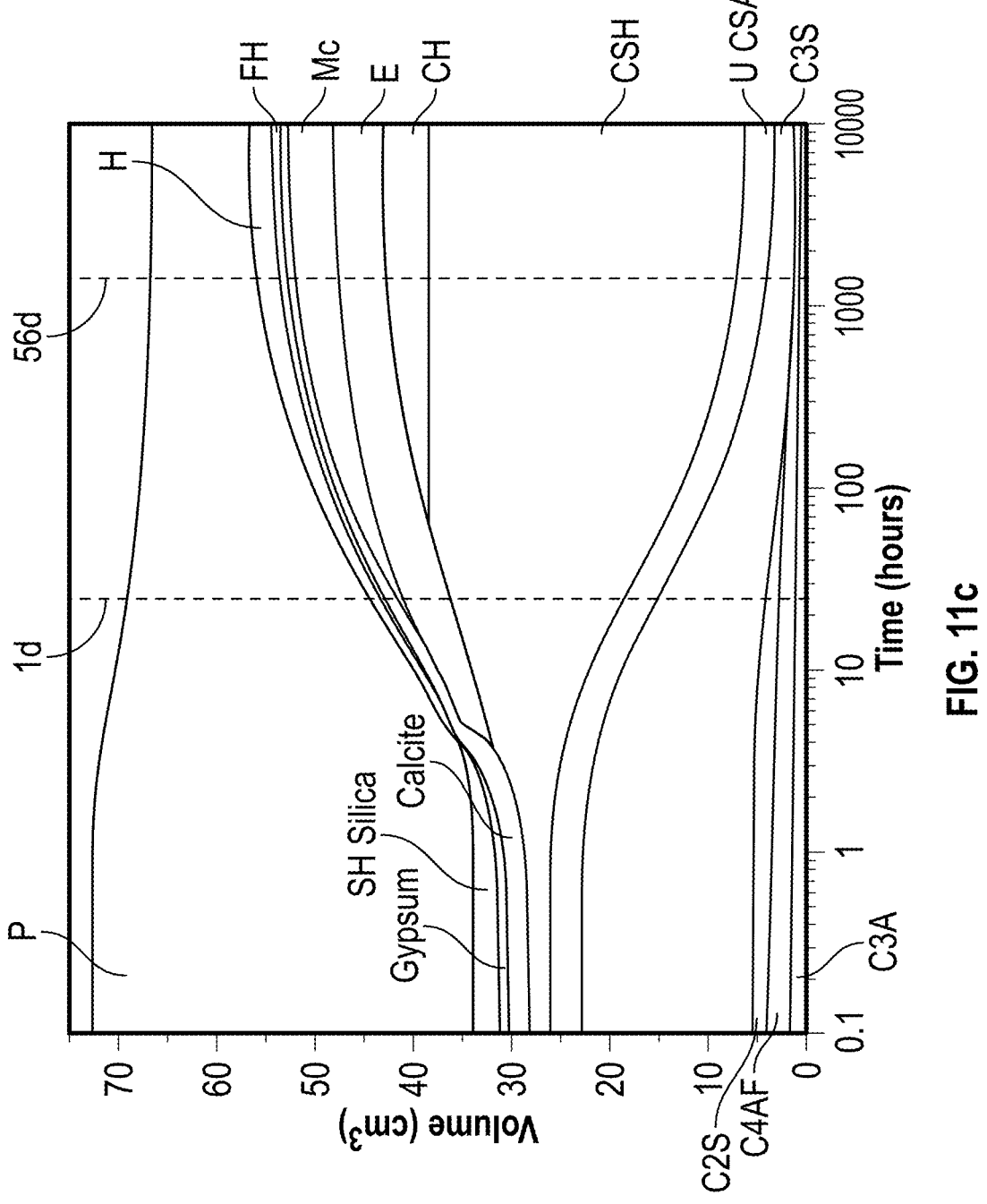
Figure 11D:
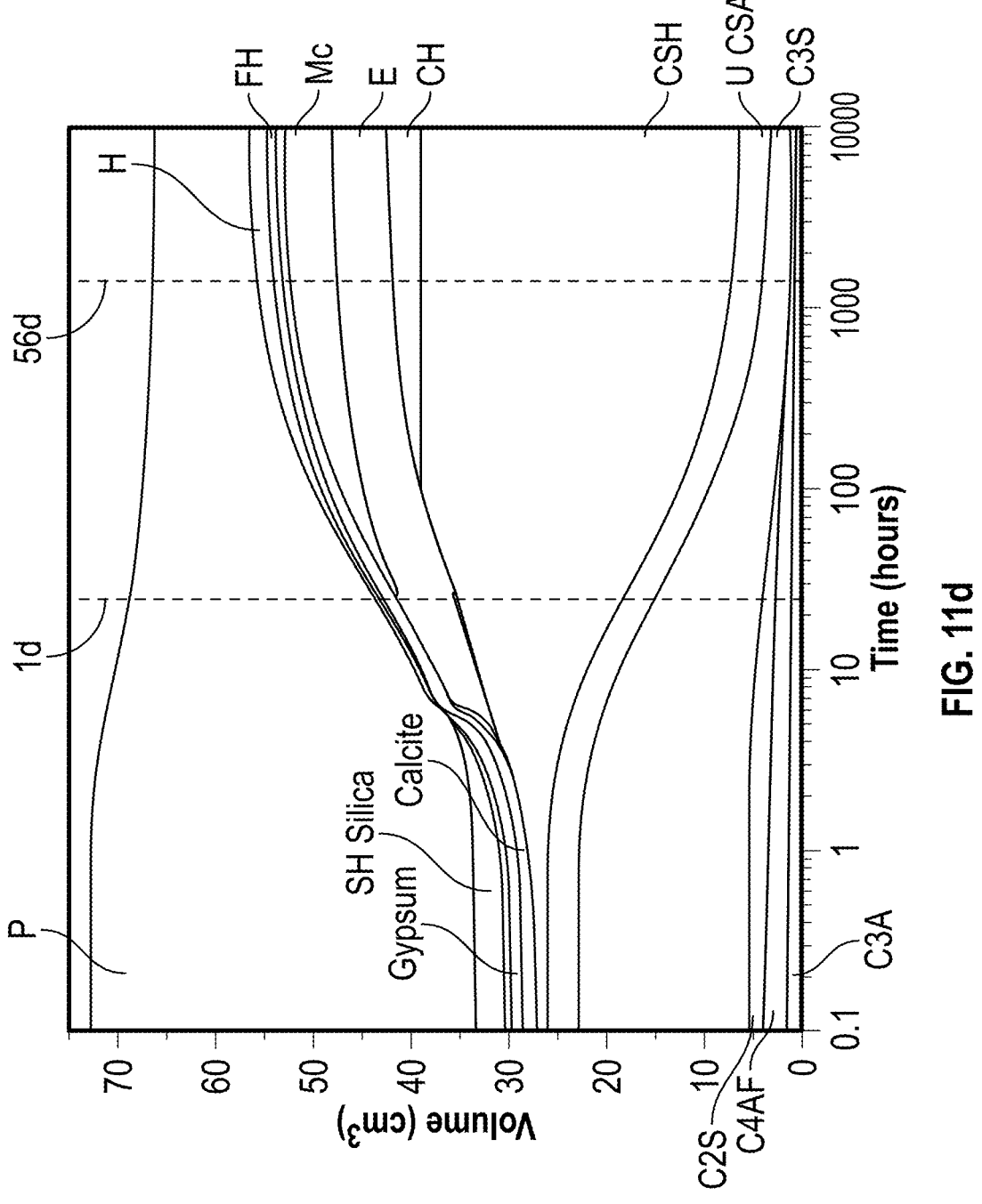
Figure 11E:
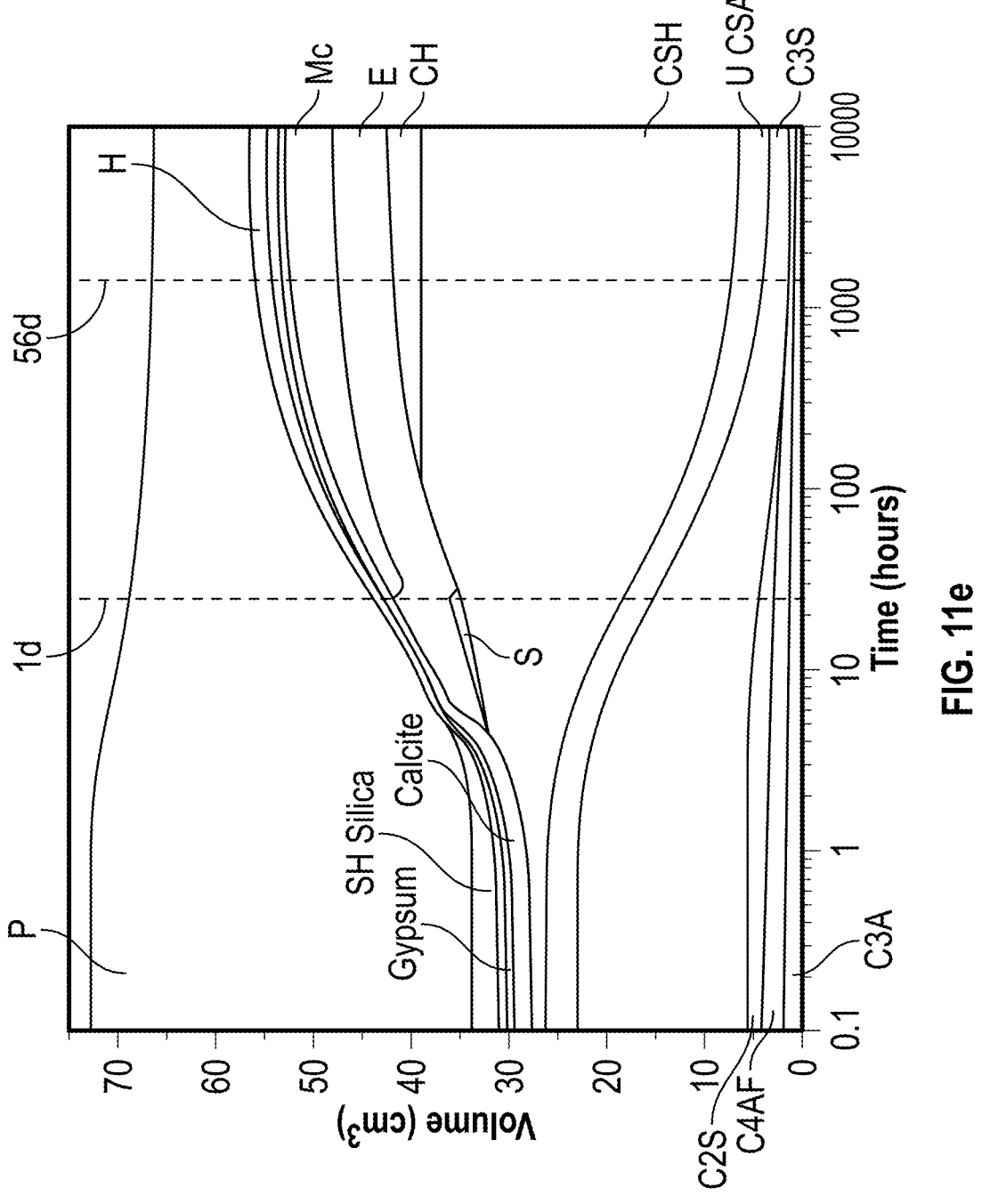
Figure 11F:
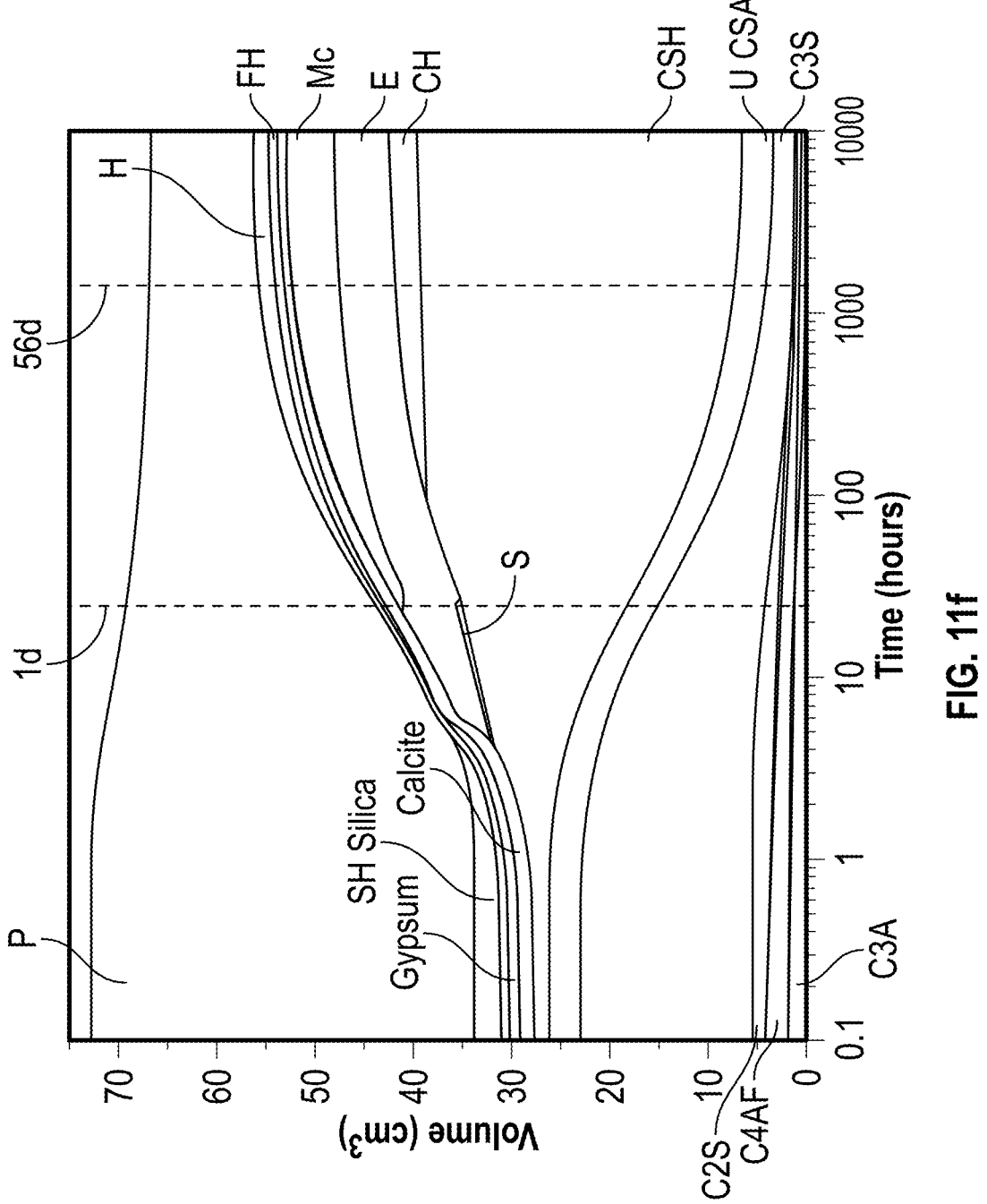

FIG. 11a-11f show the predicted hydration products based on thermodynamic modes of mixes containing OPC and pretreated CSA. Phase assemblage of hydration products was determined by using the CemGEMS thermodynamic models application. FIG. 11a shows the predicted hydration products OPC. FIG. 11b shows the predicted hydration products of untreated CSA at a replacement level of 20 mass %. FIG. 11c shows the predicted hydration products of water pretreated CSA at a replacement level of 20 mass %. FIG. 11d shows the predicted hydration products of 0.1 M $H_2SO_4$ acid pretreated CSA at a replacement level of 20 mass %. FIG. 11e shows the predicted hydration products of 0.1 M HCl acid pretreated CSA at a replacement level of 20 mass %. FIG. 11f shows the predicted hydration products of 0.1 M $C_6H_8O_7$ acid pretreated CSA at a replacement level of 20 mass %.

As shown in FIG. 11a, after 1.5 hours, gypsum starts to be consumed to form ettringite. After 9 hours, the gypsum is fully consumed. The main solid hydration products after 24 hours are alite, C—S—H, ettringite, and calcite. After that, hydrotalcite-OH and monocarbonate occur. The OPC system contains a significant amount of calcium hydroxide. The addition of CSA results in the consumption of the calcium hydroxide and formation of C—S—H. After 28 days, the OPC model containing 18.6% calcium hydroxide is reduced to 6.5% and 5% in models containing untreated and water pretreated CSA, respectively. The volume of C—S—H after 28 days increased from 35.6% in OPC to 43.2% and 45.2% in untreated and water pretreated CSA models, respectively. Calcium hydroxide consumption and formation of C—S—H are indicators of pozzolanic activity of CSA. At 28 days, the percentage of C—S—H and calcium hydroxide in models containing acid pretreated CSA is 46.5% and 3.8%, respectively. At this age, the ettringite content is 9.4%, 8.4%, and 8.6% for models containing CSA pretreated with 0.1M $H_2SO_4$, HCl, and $C_6H_8O_7$. The inclusion of pretreated CSA with $H_2SO_4$ in the OPC system leads to the formation of slightly higher ettringite content, due to the presence of higher $SO_3$ content in the chemical composition of the ash. FIG. 11b to 1 if show that the main phases in the first 24 hours are $C_3S$, unreacted CSA, C—S—H, ettringite, and calcite for untreated and pretreated CSA. After 4.5 days, calcium hydroxide, monocarbonate, and hydrotalcite-OH occur in the solid hydration products. Due to higher $SiO_2$ content of water pretreated CSA compared to untreated CSA, higher SH-Silica in the early hours is formed (see FIG. 11c) and fully consumed after 4 hours, having been converted to silica containing phases. Thus, higher levels of amorphous $SiO_2$ content may be a parameter leading to higher reactivity in the pozzolanic reaction and improving mechanical properties of the resultant concrete.

The OPC system and systems containing CSA differ in that the calcium hydroxide is present from very early hours in the OPC model. The incorporation of 20 mass % CSA leads to the consumption of calcium hydroxide in the first days. As shown in 11b-11f, the presence of calcium hydroxide is observed after 125 hours due to the reaction of CSA with $Ca(OH)_2$ to form C—S—H. When there is no more active CSA to react with calcium hydroxide, calcium hydroxide can be seen as one of the hydration products. Calcium hydroxide content reaches 0% in 20 mass % replacement level mixes of acid pretreated CSA. The main hydration products for all acid pretreated CSA are the same. Compared to water pretreated CSA, a formation of more C—S—H by consuming calcium hydroxide is observed. At replacement levels of 20 mass %, all 0.1M acid pretreated CSA has the same hydration products and shown more C—S—H and a lower calcium hydroxide content in their structure compared to the OPC system and the mix containing water pretreated CSA. Thus, the models show that AWASCMs can either wholly or partially replace the conventional SCMs without a detrimental effect on the pozzolanic reaction.

Figure 12:
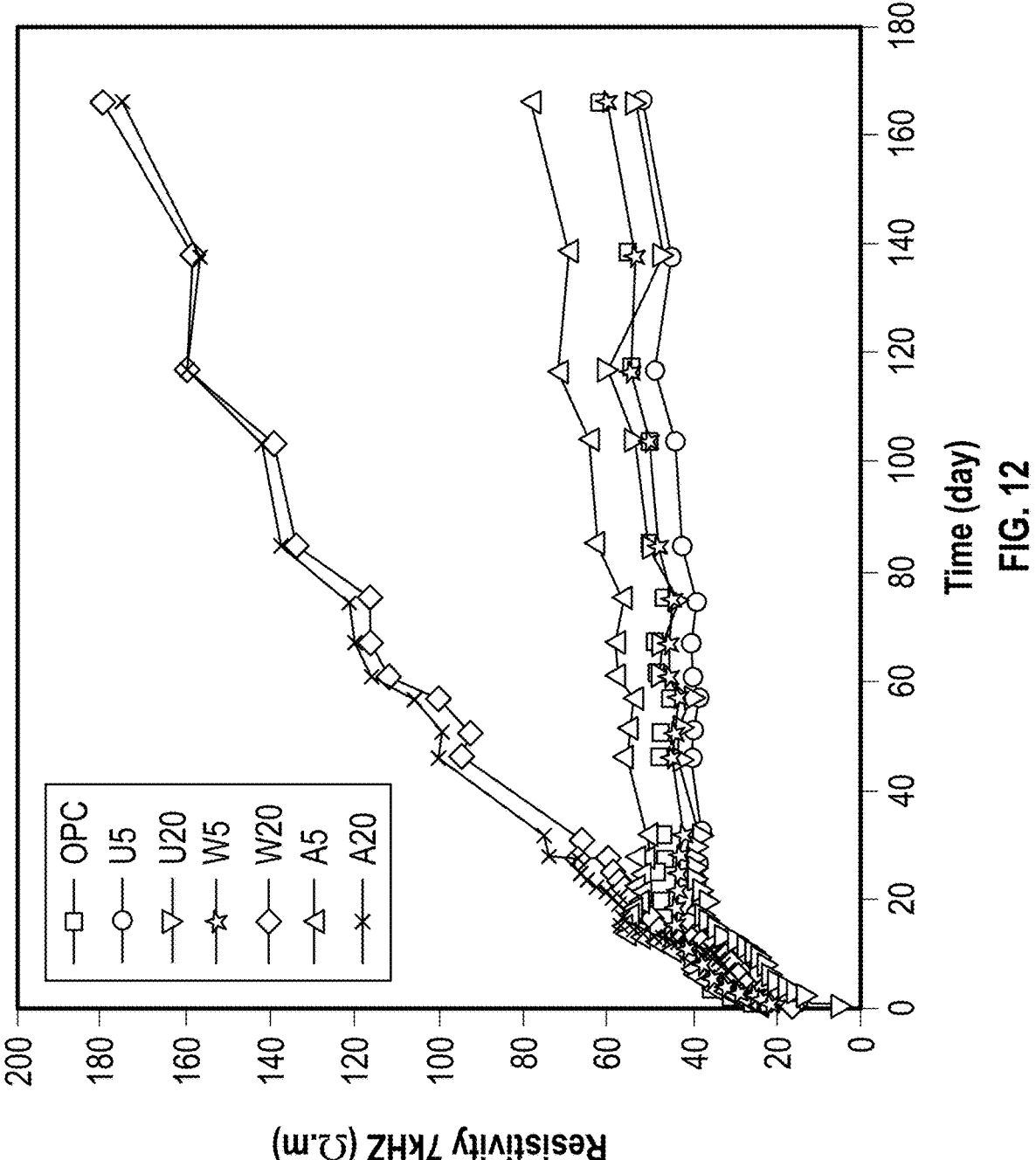
FIG. 12 illustrates the pore resistivity of concrete specimens containing CSA, according to embodiments of the disclosure.

FIG. 12 show the pore resistivity of concrete specimens containing CSA. Table 7 shows the pH, pore solution resistivity, and chemical composition of the pore solution for OPC and mixes containing 20 mass % CSA thermodynamics data at 56 days. The samples include OPC, 5 mass % replacement untreated CSA (U5), 20 mass % replacement untreated CSA (U20), 5 mass % replacement water pretreated CSA (W5), 20 mass % replacement water pretreated CSA (W20), 5 mass % replacement acid pretreated CSA (A5), and 20 mass % replacement acid pretreated CSA (A20). Untreated CSA has a high amount of alkali oxides in its chemical composition, which causes the pH of the pore solution to rise. The OPC system containing untreated CSA had a pH of 13.92, the highest among the systems. Systems containing water pretreated and acid pretreated CSA have similar pHs to the OPC system. The pH of the OPC system is 9.8 in the first 4.5 hours and gradually increases and reaches equilibrium above 13.5 after 3 days. The inclusion of CSA changes pH slightly. In the system with untreated CSA, the pH is 10.24 in the first 2.5 hours and increases gradually until stabilizing at 13.92 after 31 hours. High percentages of acid pretreated CSA from 5 mass % to 40 mass % replacement level reduce the pH of the pore solution from 13.57 to 13.13. The higher pH of the concrete pore solution can protect the embedded steel from corrosion.

and hydrotalcite are formed due to the reaction of $Al^{+3}$, $Fe^{+2}$, $Mg^{+2}$, $S^{-2}$, $Ca^{+2}$, and $OH^-$. The pore solution composition of the OPC system is mainly comprised of $K^{+2}$, $Na^+$, $S^{-2}$, and $Ca^{+2}$. The incorporation of untreated CSA increases the concentration of $Si^{+4}$, $Al^{+3}$, $S^{-2}$, and $K^{+2}$ in the pore solution. The addition of water pretreated CSA to the OPC system has a minimal impact on the pore solution chemistry. Adding acid pretreated CSA can significantly decrease the concentration of $S^{-2}$, $K^{+2}$, and $Na^+$, due to the dilution effect and the fact that acid-treated CSAs have lower alkali concentration.

Table 8 shows the mixture proportions for an OPC cement mixture (OPC samples) and a citric acid pretreated CSA cement mixture (CSA samples). The OPC cement is type VII. The citric acid pretreated CSAs were burned at 1040° F. for about 30 minutes and ground into a powder for about 45 minutes. The same water-to cementitious materials ratio was used for all samples (500 g cementitious material to 242 g of water. The mixture proportions comply with ASTM C311—Sections 27.1.1 and 27.1.2.

TABLE 8

Mixture Proportions for OPC samples and CSA samples.

| Mixture | Cement (g) | CSA (g) | Water (g) | Standard Sand (g) |
|---|---|---|---|---|
| OPC Sample | 500 | 0 | 242 | 1375 |
| CSA Sample | 400 | 100 | 242 | 1375 |

Table 9 shows the results of a flow slump test. The flow slump test is conducted in accordance with ASTM C1437. The CSA samples showed a decrease in the flowability (e.g., workability) as compared to the OPC samples. This indicates that more water is necessary for the CSA samples

TABLE 7 pH, resistivity, and pore solution composition of OPC and mixes containing 20 mass % untreated and treated CSA

| | | Resistivity | | | Treatment Method | | | |
|---|---|---|---|---|---|---|---|---|
| Models | pH | (Ω.m) | $Si^{+4}$ | $Al^{+3}$ | $Ca^{+2}$ | $S^{-2}$ | $K^{+2}$ | $Na^+$ |
| OPC | 13.59 | 0.136 | 0.059 | 0.049 | 1.010 | 2.409 | 333.707 | 39.267 |
| Untreated | 13.92 | 0.070 | 0.167 | 0.105 | 0.395 | 18.399 | 803.963 | 15.650 |
| Water | 13.59 | 0.135 | 0.059 | 0.049 | 1.004 | 2.435 | 339.284 | 41.507 |
| N0.1 | 13.54 | 0.170 | 0.404 | 1.193 | 0.303 | 3.926 | 120.383 | 41.264 |
| S0.1 | 13.53 | 0.106 | 0.051 | 0.042 | 1.204 | 1.634 | 237.248 | 91.913 |
| H0.1 | 13.52 | 0.158 | 0.051 | 0.042 | 1.227 | 1.580 | 258.908 | 63.386 |
| C0.1 | 13.54 | 0.152 | 0.052 | 0.044 | 1.165 | 1.744 | 227.120 | 112.486 |

Pore solution resistivity (the reciprocal of pore solution conductivity) is a factor affecting the ingress of harmful species in concrete. Electrical resistivity of pore solutions with different water to cement ratios is in the range of 0.115 Ω·m to 0.145 ∩·m. The untreated CSA had the lowest resistivity while the $HNO_3$ pretreated CSA had the highest resistivity. Compared to the OPC system, all models containing pretreated CSA, except for the $H_2SO_4$ pretreated CSA, had the same or higher resistivity. The incorporation of CSA in concrete can increase the resistivity by up to 180%, resulting in a decrease in the ingress of harmful species into the AWASCMs.

Upon the start of the hydration process, alkali sulfates and free line easily dissolve and leach out into the pore solution, contributing to an increase in the amount of $K^{+2}$, $Na^+$, $S^{-2}$, $CA^{+2}$, and $OH^-$ ions. The $Si^{+4}$ and $Ca^{+2}$ react to form calcium hydroxide and C—S—H. Ettringite, AFm phases, versus the OPC samples to achieve the same flowability. However, chemicals, such as common plasticizers, can be used to increase the flowability of the CSA samples.

TABLE 9

Flow Slump Test Results.

| Mixture | Measured Diameters (in) | Average Diameter (in) | Flow Slump % (increase in average base diameter) |
|---|---|---|---|
| OPC Sample | 7.5/7.1/7.6/7.0 | 7.3 | 83% |
| CSA Sample | 5.0/5.4/5.1/5.2 | 5.18 | 29% |

Table 10 shows the results of a compressive strength test and strength activity test. The compressive strength test was conducted in accordance ASTM C618. The strength activity test was conducted in accordance with ASTM C311—Section 30. The strength activity is defined as the ratio of the compressive strength of mortar mixed with pozzolans (CSA samples) to the control mortar (OPC samples). The strength activity index should be 75% or greater in order to meet the standard in ASTM C618. As shown in Table 10, the strength activity index of the CSA samples exceeds the standard 75%, having a strength activity index of 96%. Thus, no significant loss in strength is seen in the AWASCM sample.

TABLE 10

Results of a Compressive Strength Test and Strength Activity Test.

| Mixture | Average Compressive Strength (psi) | Average Compressive Strength (MPa) | Strength Activity Index (%) |
|---|---|---|---|
| OPC Sample | 5277 | 36.4 | — |
| CSA Sample | 5053.5 | 34.8 | 96% |

Table 11 shows the results of a bulk resistivity test. The bulk resistivity test was conducted in accordance with ASTM C1876. The further into the curing stage the OPC and CSA samples proceed, the more the resistivity of the CSA sample increases as compared to the OPC sample. The increase in resistivity shows that the concrete made with the CSA samples is more resistant to the ingress of harmful species, such as chlorides, representing an improvement over standard OPC cements.

TABLE 11

Results of a Bulk Resistivity Test.

| Time | OPC Sample (k · ohm · cm) | CSA Sample (k · ohm · cm) |
|---|---|---|
| 1 Day | 1.9 | 1.9 |
| 7 Day | 3.2 | 4.8 |
| 14 Day | 2.2 | 6.6 |
| 28 Day | 5.4 | 11.3 |

Table 12 shows the mixture proportions of for an OPC cement mixture (OPC samples) and a citric acid pretreated CSA cement mixture (CSA samples) for measuring the heat of hydration. Once the samples are mixed, they are immediately placed within a sealed ampoule in order measure the heat released during the hydration reaction. The ampoule is placed within a calorimeter to measure the heat released as compared to a reference sample, e.g., silica sand.

TABLE 12

Mixture proportions of for OPC samples and CSA samples.

| Mixture | OPC Sample | CSA Sample |
|---|---|---|
| Water-to-Cement Ratio | .484 | .484 |
| Cement Mass (g) | 40 | 32 |
| Supplementary Cementitious Material Mass (g) | 0 | 8 |
| Water Mass (g) | 19.36 | 19.36 |
| Empty Ampoule Mass (g) | 14.954 | 15.0027 |
| Ampoule + Sample Mass (g) | 21.9592 | 22.0086 |
| Sample Mass | 7.0052 | 7.0059 |
| Cementitious Materials Mass (g) | 4.720 | 4.721 |

Table 13 shows the results of a heat of hydration test. The normalized heat release in the CSA sample is approximately 20 J/g less than the OPC sample. The difference between the CSA samples and OPC samples are due to the decreased amount of cement in the CSA samples, which is replaced with the AWASCMs. The AWASCMs are active in heat release during the pozzolanic reaction, which occurs after the hydration reaction. Therefore, the OPC samples, which have higher amounts of cement as compared to the CSA samples, has a larger heat release during the hydration reaction.

TABLE 13

Results of a Heat of Hydration Test

| Mixture | Normalized Heat Release (J/g cementitious material) |
|---|---|
| OPC Sample | 354.82 |
| CSA Sample | 334.25 |

Embodiments described herein disclose cement and concrete compositions utilizing agricultural waste ash supplementary materials (AWASCMs) to replace conventional supplementary materials (SCMs). The AWASCMs include agricultural waste ash (AWA) and agricultural waste fibers (AWF). The AWASCMs replace between about 0% to about 50% of the SCMs. The replacement of the SCMs with AWASCMs do not detrimentally effect the pozzolanic reaction during cement formation, and can improve the mechanical properties of the cement and resultant concrete. The resultant cement and concrete having AWASCMs further decreases the environmental impact of concrete formation through the use of AWAs and AWFs.

As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, process operation, process operations, an element or a group of elements is preceded with the transitional phrase "comprising," it is understood that we also contemplate the same composition or group of elements with transitional phrases "consisting essentially of," "consisting of," "selected from the group of consisting of," or "Is" preceding the recitation of the composition, process operation, process operations, element, or elements and vice versa, such as the terms "comprising," "consisting essentially of," "consisting of" also include the product of the combinations of elements listed after the term.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. For example, the recitation of the numerical range 1 to 5 includes the subranges 1 to 4, 1.5 to 4.5, 1 to 2, among other subranges. As another example, the recitation of the numerical ranges 1 to 5, such as 2 to 4, includes the subranges 1 to 4 and 2 to 5, among other subranges. Additionally, within a range includes every point or individual value between its end points even though not explicitly recited. For example, the recitation of the numerical range 1 to 5 includes the numbers 1, 1.5, 2, 2.75, 3, 3.80, 4, 5, among other numbers. Thus, every point or individual value may serve as its own lower or upper limit combined with any other point or individual value or any other lower or upper limit, to recite a range not explicitly recited.

While the foregoing is directed to embodiments of the present disclosure, other and further embodiments of the disclosure may be devised without departing from the basic scope thereof.

What is claimed is:

1. A composition, comprising:
sand;
coarse aggregate; and
cementitious materials, the cementitious materials comprising:
  cement;
  a supplementary cementitious materials (SCM); and
  an agricultural waste ash supplementary cementitious material (AWASCM), the AWASCM comprising:
  a 500-1500° C. heat-treated agricultural waste ash (AWA), the heat-treated AWA comprising corn stover ash; and
  agricultural waste fibers (AWF), the AWF comprising corn fiber;

and wherein the AWA is an acid pretreated AWA, wherein the AWA is pretreated with hydrochloric acid (HCl), nitric acid ($H\{NO_3$), sulfuric acid ($H_2SO_4$), ethylenediaminetetraacetic acid (EDTA), acetic acid ($CH_3COOH$), citric acid, oxalic acid ($C_2H_2O_4$), or combinations thereof.

2. The composition of claim 1, wherein the SCMs and AWASCMs comprise about 5 mass % to about 60 mass % of the cementitious materials by mass.

3. The composition of claim 1, wherein the AWASCMs comprise from greater than 0% to about 30% by mass of a total mass of the SCMs and AWASCMs.

4. The composition of claim 1, wherein the AWFs comprise about 1% to about 50% by mass of a total mass of AWASCMs.

5. The composition of claim 1, wherein a chlorine content of the AWASCMs is less than 0.2 mass %, a potassium oxide content of the AWASCMs is less than about 2 mass %, a $SiO_2$ content of the AWASCMs is greater than about 70 mass %, a calcium oxide content in the AWASCMs is less than about 2 mass %, and an aluminum oxide content in the AWASCMs is about 4 mass % to about 6 mass %.

6. The composition of claim 1, wherein the AWA is a nitric acid pretreated AWA.

* * * * *